(12) United States Patent
Kaushik

(10) Patent No.: US 7,187,871 B1
(45) Date of Patent: Mar. 6, 2007

(54) INTERFEROMETRIC COMMUNICATION SYSTEM AND METHOD

(75) Inventor: Sumanth Kaushik, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 628 days.

(21) Appl. No.: 10/121,947

(22) Filed: Apr. 11, 2002

Related U.S. Application Data

(60) Provisional application No. 60/283,043, filed on Apr. 11, 2001.

(51) Int. Cl.
*H04B 10/04* (2006.01)

(52) U.S. Cl. ............. 398/183; 398/182; 398/212; 398/202

(58) Field of Classification Search ............. 398/170, 398/198, 183, 182, 212, 202; 359/237–324
See application file for complete search history.

(56) References Cited

U.S. PATENT DOCUMENTS 5,615,037 A * 3/1997 Betts et al. ............. 398/170
5,642,194 A 6/1997 Erskine \* cited by examiner

*Primary Examiner*—David C. Payne
(74) *Attorney, Agent, or Firm*—Hamilton, Brook, Smith & Reynolds, P.C.

(57) ABSTRACT

High bandwidth angle modulated communications may be obtained using an incoherent/broadband "white light" source. The light is passed through interferometer arms before and after a communication link. The light is modulated in a transmitter signal optical angle modulator and in a reference optical angle modulator. By locating an interferometer and light source at a receiver, the light passes through the interferometer both before and after the optical link to the transmitter. A balanced detector implements subtraction of non-interfering light.

50 Claims, 18 Drawing Sheets

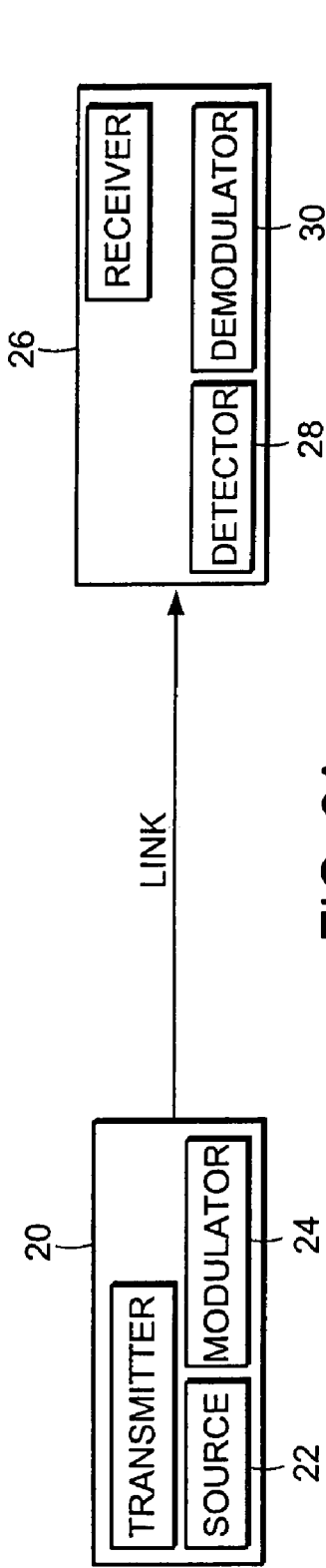
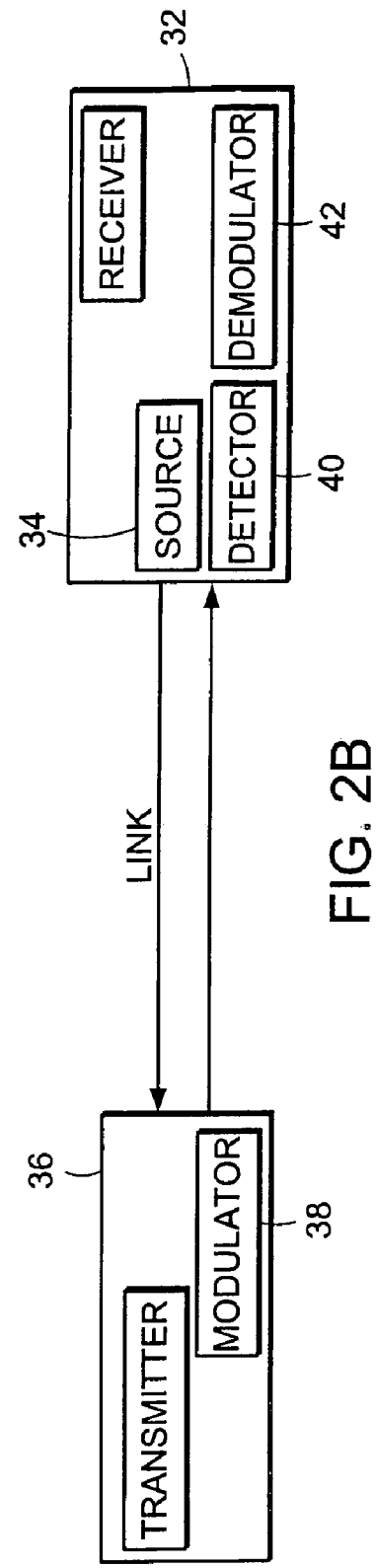

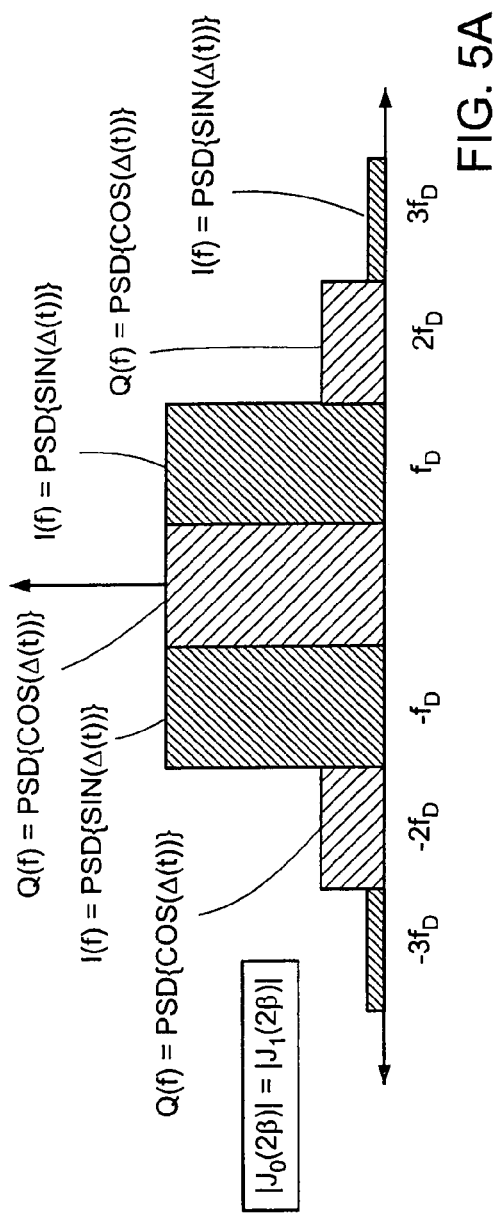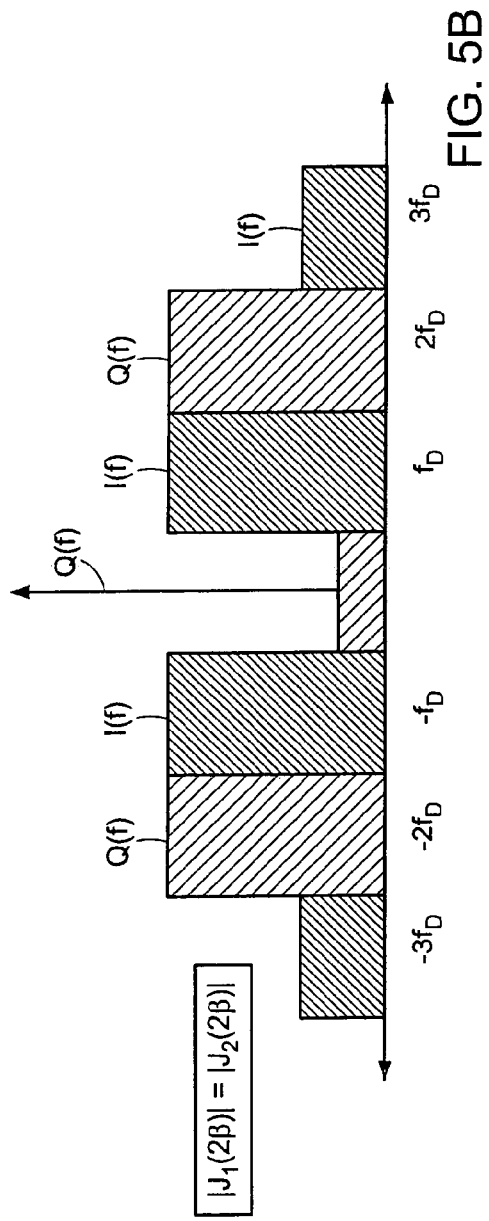

INTERFEROMETRIC COMMUNICATION SYSTEM AND METHOD

RELATED APPLICATION

This application claims the benefit of U.S. Provisional Application No. 60/283,043 filed on Apr. 11, 2001. The entire teachings of that application are incorporated herein by reference.

GOVERNMENT SUPPORT

The invention was supported, in whole or in part, by a United States Air Force contract no. F 19628-00-C-0002. The Government has certain rights in the invention.

BACKGROUND OF THE INVENTION

FIG. 2A illustrates the typical optical communication system. In a transmitter 20, light from a source 22 is modulated with the modulator 24. The modulated light is transmitted over an optical link such as a fiber optic link to a receiver 26. At the receiver, the light is detected with a detector 28 and the modulated signal is electronically modulated in a demodulator 30.

Typically the transmitted light is intensity modulated and received light is detected directly (IM-DD). Both digital and analog optical communication systems use intensity modulation. IM-DD offers a number of practical advantages that have made it the popular choice for network designers. These are:

1) Bright sources (e.g. semiconductor lasers) are readily available that can be modulated directly and rapidly (>25 GHz).
2) Receivers are easy to design and inexpensive to build and can operate at high data rates (demonstrations of >40 Gbs)
3) Optical amplifiers are available (especially at 1550 nm) that allow signals to be boosted and shot noise performance can be readily achieved.

However, IM-DD is not without important limitations. Perhaps the most important limitation is channel non-linearity. This is especially a problem in fiber optic links where non-linear processes such as stimulated Brillouin scattering (SBS), stimulated Raman scattering (SRS), cross-phase modulation (XPM), self phase modulation (SPM), and four-wave mixing (FWM) place a fundamental limit the amount of power that can be sent through optical fiber. XPM and SPM causes amplitude modulation to be converted to phase modulation, which leads to: (1) non-linear dispersion, or pulse broadening, (2) pulse jitter and (3) cross talk between multiple wavelength channels in a wavelength division multiplexed network (WDM). Typically, the maximum practical power that can travel inside a single mode fiber before limitations due to non-linear processes are observed is ~8–10 dBm.

Another important limitation with current IM-DD systems is low spectral efficiency. Even in dense WDM systems, typical 10-Gbs links have channel spacing of 50 GHz and higher, leading to a spectral efficiency of 0.2 b/s/Hz. This is to contrasted with RF wireless links that have 2 b/s/Hz and higher. The reason for the poor efficiency is the difficulty in fabricating and maintaining filters with narrow enough line widths. Multiplexing multiple IM-DD at a single wavelength is very difficult (e.g. code division multiple access CDMA). Future fiber optic links are expected to achieve bandwidths of greater than 40 Gbs and higher, and will involve significant (costly) upgrades to existing technology. Methods to increase the spectral efficiency of existing slower speed links to achieve the high data rates is therefore of immediate interest.

These reasons suggest that a method that avoids the use of amplitude modulated signals to communicate information, and which can increase spectral efficiency, would be of significant interest. One such approach is coherent communication.

Coherent detection (hence "coherent communication") typically refers to the use of a strong local oscillator (LO, which is typically a laser in optical communication) to boost a weak signal in order to enable its detection over detector thermal noise. Typically, the LO is mixed with the weak signal on a non-linear detection element (e.g. photodetector in optics) and the beat frequency between the LO and the signal is measured. The underlying physics exploited by coherent detection is the electromagnetic interference between the signal and the LO. In order for this interference to produce a measurable signal, most communication applications to date require the LO to be "coherent," which is the same as requiring the optical phase/frequency to be well defined (typically constant) over the length of measurement.

Coherent detection is contrasted by direct detection, which is based on modulating the amplitude of the transmitted electromagnetic radiation and detecting the intensity of the received signal. Coherent communication requires the manipulation of the phase of the electromagnetic radiation, whereas direct detection only requires the modulation of the amplitude. Angle-modulation (PM, phase modulation, and FM, or frequency modulation) offers a number of advantages over IM-DD. These include: (1) higher sensitivity per photon, (2) a larger dynamic range, (3) better performance in a clutter environment, (4) insensitivity to various types of non-linearity in the channel, and (5) increased spectral efficiency (i.e. more bits transmitted per signal bandwidth).

With the widespread use of erbium amplifiers to boost weak signals, the higher sensitivity offered by coherent systems has largely disappeared. Therefore, sensitivity is not a critical decision parameter in the choice between IM-DD and coherent receivers. However, what is important is that angle-modulated systems have much larger dynamic range over which signal linearity can be maintained. This can be particularly important to analog communication links where data high SNR as well as high dynamic range is of critical importance.

Although usually not considered as a principal feature, angle-modulate systems have good robustness against non-linearity, both in the channel as well as in the receiver. This feature will be stressed in some detail below. An important feature of an angle-modulated system is that the carrier is a constant amplitude signal since the phase modulation imparted on the carrier does not typically lead to an amplitude modulation. Therefore problems from XPM and SPM are significantly mitigated, especially in single channel systems. Additionally, it is well known that angle modulated systems have significantly reduced sensitivity to receiver non-linearity as compared with IM-DD systems. By introducing a frequency offset in the LO with respect to the signal, receiver non-linearity in FM/PM systems can be separated and filtered in the frequency domain.

In fact, it is the latter feature that often is emphasized as one of the principal features of coherent links. By using multiple frequency and/or phase offsets, coherent transmission offers the most simple and straightforward approach to multiplexing multiple channels in a given data stream and thereby increasing spectral efficiency of a channel.

Nevertheless, despite these apparent advantages of PM/FM systems, there are fundamental and technological issues with the optical transmitter, the communication channel, and the receiver that have limited the development of this technique. These include:

1) Laser phase noise and spectral instabilities in both coherent transmission/reception processes. The unavoidable phase noise that accompanies the output spectrum of a semiconductor laser causes considerable spectral broadening that appears as baseband noise after demodulation. Although differential detection methods reduce the requirement for laser phase stability, typically, a source with linewidths $\Delta v$ of a few MHz is required.
2) Intensity noise in the local oscillator. IM-DD is largely insensitive to intensity noise, but coherent detection, owing to the presence of a local oscillator with large power (~1 mW), is much more sensitive (requiring RIN of −160 dB/Hz or better). Differential phase methods can mitigate this significantly.
3) Drift in the optical frequency of both the transmit laser and LO. This requires the LO to have optoelectronic automatic frequency control loop with a wide acquisition range. Furthermore, homodyne systems require automatic control of the optical field instantaneous phase.
4) Depolarization. Propagation in normal optical fiber leads to signal depolarization that requires a receiver structure with active polarization control or diversity detection.
5) Legacy interface. Virtually all networks today are based on IM-DD technology. Radically different modulation format (e.g. DPSK) and signaling may require significant re-engineering of existing switches, routers and other network components.

SUMMARY OF THE INVENTION

In reviewing these limitations, it would appear that an ideal link would combine the clutter rejection advantages of coherent methods, with the simplicity of implementation of IM-DD. An ideal system should be:

a) Insensitive to the phase and intensity stability of the light source b) Compatible with rapid modulation of the source c) Constant in carrier amplitude These requirements would suggest a link using a broadband incoherent source where information is communicated using an external high-speed phase modulator. A system based on incoherent light source, would by construction, be insensitive to intensity and phase fluctuations. The use of phase modulation would, again by construction, have no amplitude modulations. The use of an external modulator would enable the use of high-speed $LiNbO_3$ phase modulation technology that currently is available at 40 Gbs and higher.

In accordance with the present invention, first and second light paths having an optical path length difference receive light from a light source and combine the light in a combined light path. Third and fourth light paths receive light from the combined light path. The third and fourth light paths have substantially the same optical path length difference as the first and second light paths. A signal optical angle modulator modulates light in one of the light paths, and a reference optical angle modulator, which may rely on the same hardware as the signal modulator, modulates light in one of the light paths. A detector receives light from the third and fourth light paths and detects a signal from the signal optical angle modulator.

The light source may be a non-coherent, white light source having a range of wavelengths and a coherence length less than the optical path length difference.

The detector may comprise a demodulator which recovers the signal using at least one frequency imposed by the referenced optical angle modulator. The detector may be a balanced detector which subtracts non-interfering components of the detected light. Light through one of the third and fourth light paths may be directed to an element of the balanced detector by a circulator.

The first and second light paths and the third and fourth light paths may be formed by a single interferometer located in the receiver with the light source and detector. In that embodiment, a receiver comprises a light source, an interferometer and a detector. The interferometer forms the first and second light paths which receive light from the light source. Light returned from the transmitter to the detector passes through those same light paths in the reverse direction, thus forming the third and fourth light paths noted above. The signal optical angle modulator is positioned in a transmitter at the opposite end of a communication link. The reference optical angle modulator would typically be positioned in the receiver.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a block diagram of a communication system in which the light source is located in the transmitter.

FIG. 2B is a block diagram of a system in which the light source is located in the receiver.

FIG. 5 illustrates spectra associated with the embodiment of FIG. 4.

DETAILED DESCRIPTION OF THE INVENTION

A description of preferred embodiments of the invention follows.

1. Introduction

As described below, a white-light interferometer that can be used for high bandwidth angle-modulated communication links. A key feature of this interferometer is that it enables the use of incoherent/broadband source for "coherent" communication.

Figure 1A:
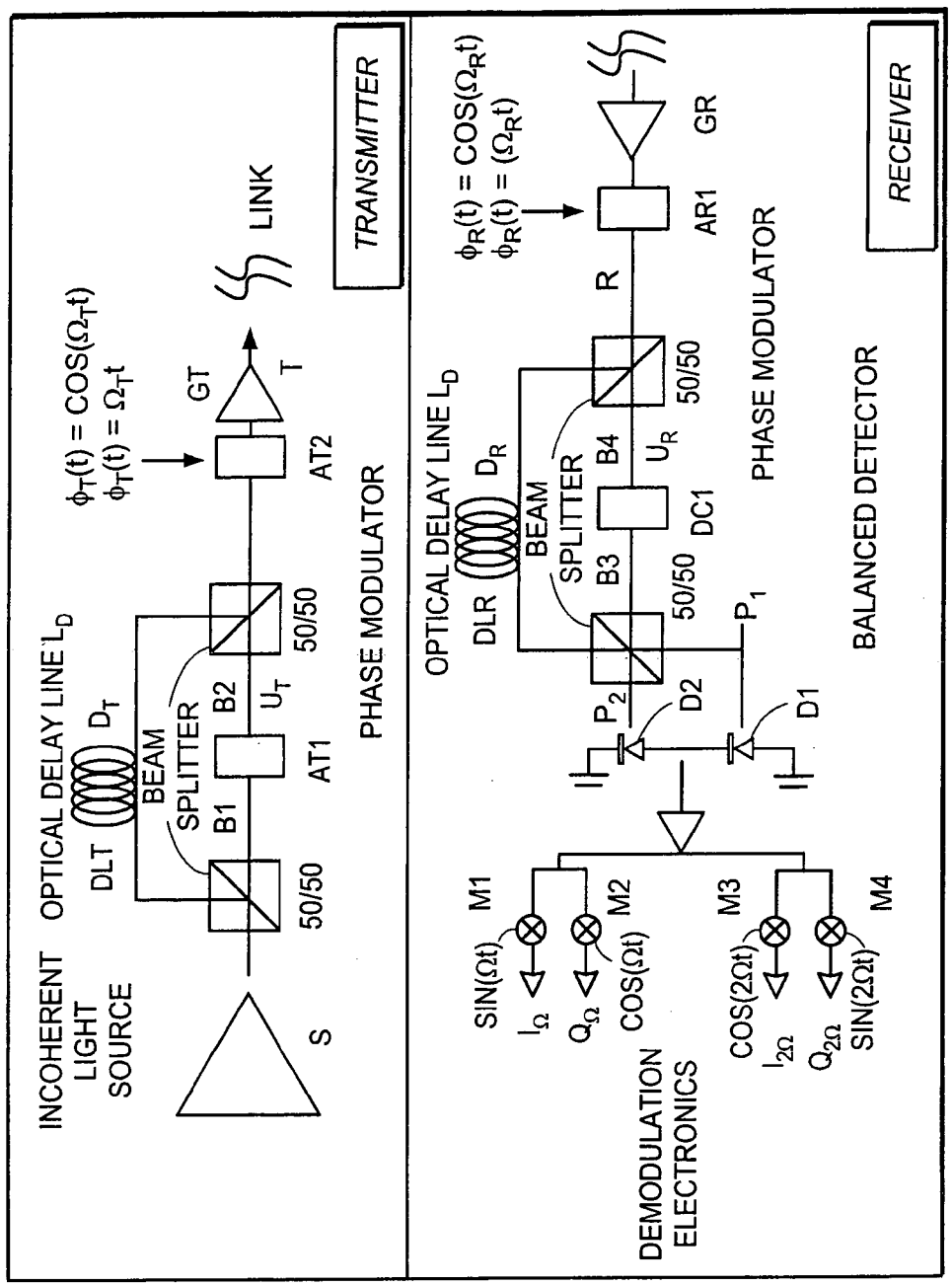
FIG. 1A illustrates one embodiment of the invention in which a light source is located in the transmitter.
Figure 1B:
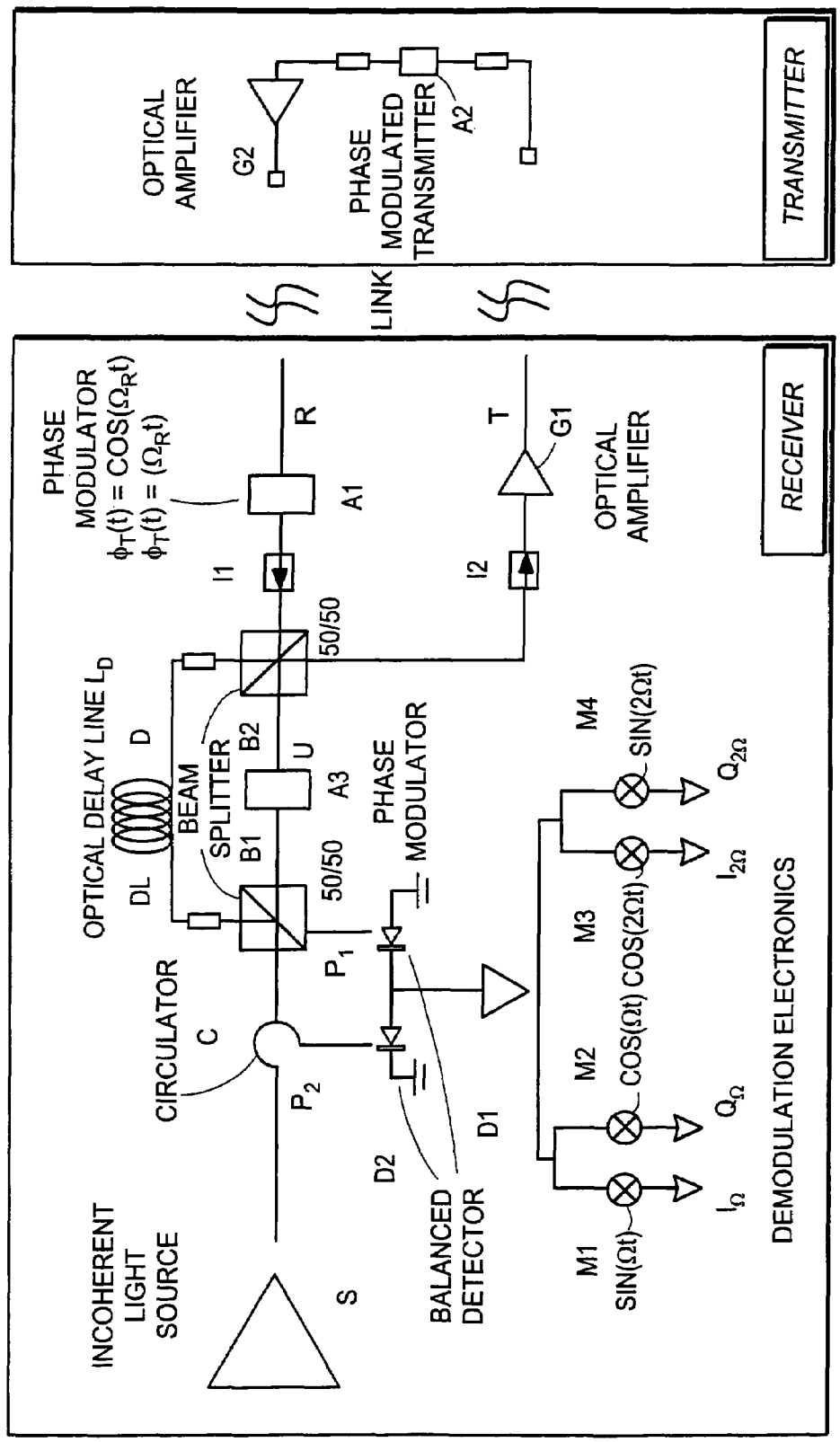
FIG. 1B illustrates a second embodiment of the invention in which the light source is located in the receiver.

The method described here is based on white light interferometry using an unequal path Mach-Zehnder (UMZ) interferometer. Two possible embodiments of the concepts are shown in FIGS. 1A and 1B. These will be referred to as Embodiment A and Embodiment B, respectively. Embodiment A uses the basic configuration of FIG. 2A and is similar in spirit to many current coherent lightwave systems, especially ones based on differential phase shift keying (DPSK) in which a delayed optical path is combined with an undelayed optical path in an unequal path Mach-Zehnder interferometer. However, it departs significantly from prior work in that:

(1) The optical source can be any arbitrary waveform (pulsed or continuous (CW) wave) as long as the coherence length is considerably less than the path lengths that comprise the interferometer. This is in contrast to current coherent lightwave systems that require the use of a narrow linewidth source. In the text, the term "white light" will be used to refer to an optical source whose coherence length is smaller than the path length difference of the interferometer.

(2) The transmitter is also an interferometer and contains one or more delay elements (only one is shown in FIG. 1A). Current coherent lightwave systems using DPSK do not employ an interferometer in the transmitter.

(3) Presence of phase modulators in the interferometer paths. This enables a direct recovery of the modulated phase rather than the phase difference. Current DPSK systems can only measure differential phase.

An alternate concept using white light is the embodiment shown in FIGS. 1B and 2B. Embodiment B represents a significant departure from current communication systems. Embodiment B is similar in spirit to differential phase shift keying (DPSK) in which a delayed optical path is combined with an undelayed optical path in an unequal path Mach-Zehnder interferometer. However, there are a number of important differences. These are:

1) Once again, rather than using a narrow linewidth sources (e.g. laser) as in conventional coherent communication, the technique described employs a broadband incoherent source where the coherence length is considerably less than the interferometer arm path length difference.

2) The receiver supplies the optical source that is "encoded" by the UMZ, to the transmitter.

3) The transmitter phase modulates the received optical source and sends it back to the receiver, where the return light retraces the same UMZ and the modulated signal is demodulated by the interferometer In this approach, both the transmitter and receiver transmit and receive light, but the information flows from transmitter to the receiver. FIGS. 2A and 2B show a typical optical fiber communication link. (It should be noted that although this discussion is principally to optical communication links, and in particular fiber optic links, the underlying concepts are quite general and apply to any type of link.)

In a typical link, the transmitter consists of a light source (typically coherent) and a modulator (either through an external modulator, or through the direct modulation of the source). Modulated light is sent to the receiver that detects, and depending on the modulation format, suitably demodulates the data. In the method of FIGS. 1B and 2B, the light source 34 is located not at the transmitter 36, but at receiver 32. The receiver supplies the source that the transmitter modulates in modulator 38. Thus, in this scheme, a bi-directional light path is required from the transmitter and the receiver. Additionally, in this approach, light travels twice as far to get to the detector 40 from the source compared with conventional links.

The method shown in FIG. 1B may appear to be a highly convoluted light path when compared with traditional links based on FIG. 2A, but the interferometer is much easier to build and stabilize. It is self-referential in that is insensitive to changes in path length, and does not require a second interferometer to demodulate.

Both the Embodiments A and B share some important advantages over current amplitude and phase modulated communication systems. These are:

1) Significant immunity from non-linear cross talk and other optical non-linearities. This enables the use of higher-power optical sources that translates into longer distance links.

2) Increased spectral efficiency. The use of higher power sources enables multi-level ("M-ary") signaling, which increases the channel capacity. An all-optical implementation of QPSK is shown using the white light interferometer that increases capacity by 2× over optical DPSK and other multiplexing techniques are suggested that could increase capacity even further.

2. System Descriptions

The communication link is divided into two basic subsystems: the transmitter and the receiver. The specific design of the transmitter and receiver differ for Embodiments A and B; however, both embodiments include at least one angle modulator A2 and perhaps an optical amplifier G2 to boost the transmitted (or return) signal. The term "angle modulator" refers to the general modulation of the optical phase, and includes in its definition both phase modulation as well as frequency modulation. In practice, different photonic components may be used for frequency and phase modulation, but the physics and mathematics are most simply expressed in terms of angle modulation.

A common feature of both the Embodiments A and B is the use of a "white light" or "incoherent" source S. It would first be useful to define the term white light/incoherent light as it is used herein. It is well known that light from a source S cannot exhibit interference if it travels along two different paths whose optical path difference (OPD) differs by a distance larger than the coherence length $L_C$. We will use time and distance interchangeably since they are linearly related by the speed of light (L=cT, where c is the speed of light). Therefore, a source described in terms of a coherence length $L_C$ can be interchangeably described in terms of a coherence time $T_C=L_C/c$.

The term "interference" is often described in terms of the autocorrelation of a time varying electric field $E_s$. It is useful to define and understand as it relates to the methods described here. Consider light that impinges on a detector D from a constant amplitude source S that has traveled two distinct paths. Light is expressed in terms of the electric fields $$E_1(t) \equiv E_s(t-T_1) = E_0 exp(j\phi(t-T_1))$$

$$E_2(t) \equiv E_s(t-T_2) = E_0 exp(j\phi(t-T_2))$$

where $T_1$ and $T_2$ are the total time required for the light to travel each of the paths. By expressing light in this form, it is seen that fields, by construction, have constant amplitudes $$|E_1(t)|^2 = |E_2(t)|^2 = E_0^2$$

The assumption of a constant amplitude source is not essential for the functioning of methods shown in FIGS. 1A and 1B; however, this assumption greatly facilitates the understanding of "coherence" as it is used in this text.

Using this representation of the fields, a detector D that measures, not the field, but instead the amplitude $$\begin{aligned} D(t) &= \langle |E_1(t) + E_2(t)|^2 \rangle \\ &= \langle |E_1(t)|^2 \rangle + \langle |E_2(t)|^2 \rangle + \langle E_1(t)E_2^*(t) \rangle + \langle E_1^*(t)E_2(t) \rangle \\ &= 2E_0^2 + \langle E_s(t)E_s^*(t-T_D) \rangle + \langle E_s(t-T_D)E_s^*(t) \rangle \\ &= 2E_0^2 (1 + \langle \cos(\varphi(t) - \varphi(t-T_D)) \rangle) \end{aligned}$$

The notation ⟨...⟩ indicates a time/ensemble average. In the above equation, we have substituted $$\langle E_s(t-T_1)E_s^*(t-T_2) \rangle = \langle E_s(t)E_s^*(t+T_1-T_2) \rangle = \langle E_s(t)E_s^*(t-T_D) \rangle$$

with no loss in generality.

Assuming a source with a spectral bandwidth $f_0$ that is much greater than the detector bandwidth $f_D$ (i.e. $f_0 \gg f_D$), it can be shown for an "incoherent" or "chaotic" source $$\langle \cos(\phi(t) - \phi(t-T_D)) \rangle = g(T_D)$$

where $g(T_D)$ is a monotonically decreasing function of the time delay $T_D$. Depending on the statistical property of the source, $g(T_D)$ has a number of functional forms, some of which include $$g(T_D) = \begin{cases} \exp\left(-\left(\frac{T_D}{T_C}\right)^2\right) \\ \frac{1}{1 + \left(\frac{T_D}{T_C}\right)^2} \\ \vdots \end{cases}$$

In each expression above for $g(T_D)$, a parameter $T_C$ appears and is often called the "coherence time" for the source. This coherence time $T_C$ is related to both the statistical properties of the source, as well as its spectral width $f_0$. From the time $T_C$, one obtains $L_C = cT_C$ which is then defined to be the coherence length. Note that a similar definition can be applied to pulsed sources as well, provided that the pulse width $T_P < T_D$.

Underlying Embodiments A and B is that $g(T_D)$ is small. In Embodiment A, $T_D$ is the optical path difference between the two paths that comprise the interferometer in each of the transmitter and receiver separately (see Sec. 3.1). In Embodiment B, $T_D$ is the optical path difference between the two paths in the receiver (see Sec. 3.2). Note that in Embodiment A, the transmitter and receiver each has an optical delay line $(T_D)_{transmit}$ and $(T_D)_{receive}$. It will be discussed in Sec. 3.1 that, whereas the $(T_D)_{transmit} \gg T_C$ and $(T_D)_{receive} \gg T_C$, the following $|(T_D)_{transmit} - (T_D)_{receive}| < T_C$ is required. That is to say that the path differences in each of the transmitter and receiver optical systems must be substantially the same to within a coherence time/length.

As mentioned earlier, the principal constraint on the source and the delay lines are that $g(T_D)$ must be small. For a Gaussian filtered white light source with spectral FWHM (at $e^{-1}$) of $f_0$, the cross-correlation is $$g(T_D) = exp(-(\pi f_0 T_D)^2)$$

Thus for this source $T_C = 1/f_0/\pi$. In most communication applications, $T_D > 5T_C$ is more than adequate. Therefore, for a value of $f_0 = 60$ GHz (FWHM ~0.5 nm at $\lambda_0 = 1550$ nm), the cross-correlation is one e-fold down at $T_D \sim 5$ ps, or ~1 mm in an optical fiber and one would typically want $L_D > 5L_C \sim 5$ mm. The spectral width of the source $f_0$ is chosen to be greater than the signal bandwidth $f_0 > B_s$. In practice the source spectral width is significantly larger than the signal bandwidth due to the difficulty in manufacturing filters with a narrow passband. For example, a 10 Gbit/s fiber optic link would require a filter with 0.08 nm spectral width.

Having this as a background, we now describe the Embodiments A and B in further detail.

3.1 Non Self-Referential White Light Communication Link

The link in the embodiment shown in FIG. 1A comprises:
1) Light source S.
2) A transmitter that comprises
   i. At least one unequal path Mach-Zehnder (UMZ) interferometer. An UMZ comprises of two beamsplitters (B1 and B2) and an optical delay line (DLT). The optical delay line can be free-space, optical fiber or any other suitable media that introduces a difference in optical lengths between the different legs in the interferometer.
   ii. At least one signal angle modulator AT in paths $U_T$ (undelayed), $D_T$ (delayed) or T.
3) The receiver comprises
   i. At least one UMZ that is matched (see below for definition) to the UMZ at the transmitter. The UMZ comprises two beamsplitters (B3 and B4) and optical delay line (DLR).
   ii. One balanced detector pair (D1 and D2) that measures the difference between light passing through light paths P1 and P2 at beamsplitter B3.
   iii. An optional dispersion compensator DC1 to compensate for the dispersion and mean phase introduced by the link and/or AT1 (if used).
4) Demodulation electronics whose nature depends on: (a) the data format, (b) signal bandwidth, and (c) the location of angle modulator at the transmitter. Signal demodulation can be done in one of several methods with a reference optical angular modulator at, for example, AR1, AT1 or AT2. Three of these include:
   i. An RF demodulator comprising at least two quadrature mixers at multiple harmonic frequencies (e.g. $\Omega$ and $2\Omega$ is shown)
   ii. An all-optical demodulator using a reference optical frequency shifter at, for example, AR1, AT1 or AT2
   iii. An all-optical demodulator using a reference optical phase modulator at, for example, AR1, AT1 or AT2

The device comprising the beamsplitters and the paths $D_T$ and $U_T$ is referred to as an interferometer in that such a device would result in interference with a coherent light source. It is understood that, where an incoherent light source is used, interference would not be obtained from the device alone. However, as will be described, using two such interferometers or passing light through the same interferometer twice, the overall system is able to provide interference using an incoherent light source.

The multiple light paths of the present invention may be obtained by plural interferometers coupled in series. Additional interferometers increase the number of light paths and, thus, the complexity of the detector processing. Providing at least two light paths between the light source and signal modulator and at least two light paths between the signal modulator and detector, the desired two sets of light paths having equal optical path length differences are obtained.

Parallel interferometers may also be used for parallel signals as described below.

In one form, the method illustrated in FIG. 1A works as follows. The light from source S (assumed be a broadband incoherent source with a coherence length much less than the length of the delay line $L_C \ll L_D$) reaches the detectors D1 and D2 along four distinct paths that are labeled, (1) UU, (2) UD, (3) DU and (4) DD. Thus, for example, UU path is the path where light travels through both the $U_R$ and $U_T$ paths (thereby passing through AT1, AT2, AR1 and AR2). The other paths can be similarly described.

1. UU Path: Light travels through paths $U_T$ and $U_R$
2. UD Path: Light travels through paths $U_T$ and $D_R$
3. DU Path: Light travels through paths $D_T$ and $U_R$
4. DD Path: Light travels through paths $D_T$ and $D_R$ By construction, the interferometer shown in FIG. 1A has unequal paths with the source S having a coherence length $L_C \ll L_D$. Therefore, it would seem the interferometer as shown cannot exhibit interference.

However, a more careful examination of the paths traveled by light from source S to the detectors D1 and D2 shows that there exists a set of paths between S and D1/D2 whose paths lengths can be identical (i.e. OPD=0) and therefore capable of interfering. Indeed, consider the link in the absence of the angle modulators AT1, AT2, and AR1. The paths {UU, DD}, {UU, DU} and {DU, DD} do not mutually interfere because the total OPD between these pairs of paths are DLR+DLT, DLT and DLR respectively, and provided that $L_D \gg L_C$ for both DLR and DLT, we see that these paths cannot interfere. Here, we assume, with no loss of generality, that the paths $U_R$ and $U_T$ introduced zero delay (with all the delay being introduced by the delay line).

However, the {UD, DU} paths can interfere. In the absence of the angle modulators, the UD, and DU paths traverse the distance UD=$U_T$+$D_R$ and DU=$D_T$+$U_R$. By choosing the lengths of $U_R$, $U_T$, DLT and DLR such that UD=DU, it can be seen that the OPD=0 for the {UD, DU} paths. Thus, there is perfect constructive interference. However, for this concept to work, the OPD in each interferometer $D_T$-$U_T$ must be matched to within a coherence length $L_C$ (|UD−DU|<$L_C$) in order for the interference to occur. This is the principal requirement for this embodiment.

Assuming that UD and DU paths are matched as required and the presence of the angle modulators at AT1 and AT2, the optical path length through the UD and DU can be modulated in time. This modulation causes the relative path lengths of UD and DU to change (i.e UD(t)≠DU(t)). This change in OPD modulates the interference, and is detected by D1 and D2 as amplitude modulation. This is the basis of communication for the system.

The angle modulators at AT1 and AT2 do not produce identical signals at D1 and D2 (for a given modulation). Angle modulation at AT1 does not modulate the phase of the light traveling through path DLT, whereas angle modulation at AT2 modulates light that travel through both paths. However, light that impinges on AT2 after going through path $D_T$ arrives at a later time than the light that travels through path $U_T$. Thus, in the presence of time varying angle modulation, the phases imparted for the "delayed" light (through DLT) and "undelayed" light (through $U_T$) are not the same.

One important issue that might arise in using an angle modulator at AT1 is dispersion. Angle modulators can be made of material that is substantially different than the material that comprise the delay line, and consequently may be dispersive (index of refraction, and therefore the optical path length, varies as a function of wavelength). This dispersion may be compensated by placing a suitable dispersion compensator DC1 in the receive path.

Mathematically, the detector signal at the detector can be written as $$D1(t) = \frac{P_T}{2} + \frac{P_T}{4}\cos(\phi_1(t) + \phi_2(t) - \phi_2(t - T_D) + \phi_R(t - T_L) - \phi_R(t - T_L - T_D))$$

$$D2(t) = \frac{P_T}{2} + \frac{P_T}{4}\cos(\phi_1(t) + \phi_2(t) - \phi_2(t - T_D) + \phi_R(t - T_L) - \phi_R(t - T_L - T_D))$$

$$D1(t) - D2(t) = \frac{P_T}{2}\cos(\phi_1(t) + \phi_2(t) - \phi_2(t - T_D) + \phi_R(t - T_L) - \phi_R(t - T_L - T_D))$$

where $P_T$ is the transmitted power. The angle modulators AT1, AT2 and AR1 impart angle modulation, $\phi_1(t)$, $\phi_2(t)$ and $\phi_R(t)$. The link is assumed to introduce a time $T_L$ that represents the time required for light to propagate from the transmitter to the receiver. $T_D$ is the time difference of the UMZ paths.

It is seen from the above equation, the angle modulator at AT2 results in a detected signal that is a phase difference whereas the angle modulator at AT1 results in a detected signal that is the phase. The former is analogous to DPSK, whereas the latter is similar in spirit to phase shift keying (PSK). It should be noted that PSK is very difficult in practice to implement in standard coherent lightwave system due to extremely tight requirements on laser phase stability. In the embodiment shown here, the implementation of PSK does not require phase stability of the source (i.e. coherent) and is a significant advantage of the present concept over the current art.

3.2 Self-Referential White Light Communication Link

There are a number of system advantages of the embodiment described in Section 3.1. These will be discussed in Sec. 4. However, there are a number of issues as well. Perhaps the most important requirement is to match the UD and DU paths. For very broadband sources $L_C$ can be small (<100 micro-meters) and this may be difficult in some circumstances. Furthermore, the delay paths can be dispersive (especially if an optical fiber is used for a delay line) and it may be hard to match the dispersion if a very broadband source is used. Therefore, a method that does not require matching the path lengths, or one where the path lengths are automatically matched at all wavelengths would be useful.

The embodiment shown in FIG. 1B achieves this goal. The link comprises
1) Light source S.
2) At least one unequal path Mach-Zehnder (UMZ) interferometer comprised of two beam splitters (B1 and B2) and an optical delay line (DL).
3) A balanced detector pair (D1 and D2) that measures the difference between light passing through light paths P1, passing through B1 from path D or reflected from path U, and P2 that is reflected from B1 from path D or passed through from path U and also passing through an optical circulator C.
4) At least one angle modulator between source and detector (eg. A1, signal modulator A2 and/or A3)
5) Demodulation electronics whose nature depends on the specific data format and signal bandwidth. Two specific demodulators are described here:
   a. An RF demodulator comprising of at least two quadrature mixers at multiple harmonic frequencies (e.g. Ω and 2Ω is shown)
   b. An all-optical demodulator using an optical frequency shifter
   c. An all-optical demodulator using a optical phase modulator
6) Suitable optical amplifies G1 and G2 may also be included.
7) Isolators I1 and I2 direct the light first through path T. Alternatively, the phase modulator could be limited to the return path by circulators in a single link.

Once again, the light source S is assumed to be a broadband incoherent source with a coherence length $L_c$ much less than the length of the delay line $L_D$. Light from source S to detectors D1 and D2 takes four distinct paths that are labeled, (1) UU, (2) UD, (3) DU and (4) DD. These paths are
   a. UU Path: U→T→A2→R→A1→U→P1/D1 and U→T→A2→R→A1→U→P2/D2
   b. UD Path: U→T→A2→R→A1→D→P1/D1 and U→T→A2→R→A1→D→P2/D2
   c. DU Path: D→T→A2'→R→A1→U→P1/D1 and D→T→A2'→R→A1→U→P2/D2
   d. DD Path: D→T→A2'→R→A1→D→P1/D2 and D→T→A2'→R→A1→D→P2/D2

Note that we have included the angle modulators A1 and A2 as paths, because the change in optical phase is equivalent to a change in optical path length. Also, the modulator A3 has been omitted for simplicity. The paths DU and DD use A1' and A2' to indicate that owing to the unequal arm lengths in the interferometer (D≠U) light from source S along paths U and D arrive at the angle modulators at different times.

Once again, it would appear that the unequal paths in the interferometer would preclude interference effects from being observable. Indeed, the UU and DD paths do not mutually interfere, nor do they interfere with the UD and DU paths since the coherence length of the source S is much smaller than the path $L_D$. However, a careful examination of the paths traveled by light from source S to the detectors D1 and D2 shows that there exists a set of paths between S and D1/D2 whose paths lengths can be identical (i.e. OPD=0) and therefore capable of interfering.

The UD and DU paths travel UD=U+T+A1+R+A2+U+P1 and DU=U+T+A1'+R+A2'+U+P1 respectively, which imply the OPD=UD−DU=A1−A1'+A2−A2'. Again, we use a short hand notation UD to refer to a total path length that is composed of the sum of the optical path lengths through the interferometer (U,T,R, and P1) and path length introduced by the angle modulators at A1 and A2.

Therefore, it is seen that the OPD=0 unless A1 and A2 are modulated in time (that is A1≠A1' or A2≠A2'). Angle modulation at the transmitter A2 appears as an amplitude modulation at detectors D1 and D2. This is the basis of communication for the system. The receiver supplies to the transmitter an optical source that is spectrally encoded via the UMZ, and the transmitter modulates the angle of the received optical signal with the message/information to be communicated. The angle-modulated signal is then is sent back to the receiver through the same UMZ, and appears as amplitude modulation at D1 and D2.

Mathematically, one can write the following expressions for the detector signals $D_1(t)$ and $D_2(t)$ in terms of the source electric field $E_s(t)$:

$$D_1(t) = \langle |jE_{UU}(t) + jE_{UD}(t) - jE_{DU}(t) - jE_{DD}(t)|^2 \rangle$$
$$= \langle |E_{UU}(t)|^2 \rangle + \langle |E_{UD}(t)|^2 \rangle + \langle |E_{DU}(t)|^2 \rangle + \langle |E_{DD}(t)|^2 \rangle -$$
$$Re\{\langle E_{UD}(t)E^*_{DU}(t)\rangle\}$$
$$= \frac{P_T}{4}(2 - \cos(\phi_R(t) - \phi_R(t-T_D) + \phi_T(t) - T_D - T_L)))$$

$$D_2(t) = \langle |E_{UU}(t) - E_{UD}(t) - E_{DU}(t) + E_{DD}(t)|^2 \rangle$$
$$= \langle |E_{UU}(t)|^2 \rangle + \langle |E_{UD}(t)|^2 \rangle + \langle |E_{DU}(t)|^2 \rangle + \langle |E_{DD}(t)|^2 \rangle +$$
$$Re\{\langle E_{UD}(t)E^*_{DU}(t)\rangle\}$$
$$= \frac{P_T}{4}(2 + \cos(\phi_D(t) - \phi_D(t-T_D) + \phi_T(t) - T_D - T_L)))$$

where $$\langle E_{UU}(t)E_{UD}^*(t)\rangle = \langle E_{UU}(t)E_{DU}^*(t)\rangle = \langle E_{UU}(t)E_{DD}^*(t)\rangle = \langle E_{UD}(t)E^*_{DD}(t)\rangle = \langle E_{UU}(t)E_{DD}^*(t)\rangle = 0$$

and $$E_{UU}(t) = E_S(t-T_D-T_L)exp(j\phi_R(t)+\phi_T(t-T_L))$$

$$E_{UD}(t) = E_S(t-T_D-T_L)exp(j\phi_R(t-T_D)+\phi_T(t-T_D-T_L))$$

$$E_{DU}(t) = E_S(t-T_D-T_L)exp(j\phi_R(t)+\phi_T(t-T_L))$$

$$E_{DD}(t) = E_S(t-T_D-T_L)exp(j\phi_R(t-T_D)+\phi_T(t-T_D-T_L))$$

Here, the angle modulators at the receiver at A1 and the transmitter A2 are assumed to introduce the modulation $\phi_R(t)$ and $\phi_T(t)$ respectively. As defined in Sec. 3.1, the link introduces a delay $T_L$. These results assume ideal 50/50 beam splitters that divide power equally between paths U and D. Non-ideal beam splitters do not change the basic conclusions. They merely reduce the detected signal (by an amount corresponding to the deviation from 50/50), but do not distort the detected signal.

As is seen, the detector signal D1 and D2 both have a constant amplitude that is independent of A1 and A2, and an interference term that varies with the cosine of the phase modulation. The constant amplitude comes from the non-interfering paths, and is identical for D1 and D2. The interference term in D1 and D2 are equal in magnitude but different in sign. This difference arises due to the π/2 phase imparted by the beam splitters. Therefore, by subtracting D1 and D2, one can eliminate the constant (or common mode) signal and retain only the interference term.

This yields $$V(t) = D_1(t) - D_2(t) = \frac{P_T}{2}\cos(\phi_R(t) - \phi_R(t-T_D) + \phi_T(t) - \phi_T(t-T_D-T_L))$$

where $P_T$ is the transmitted power. In addition to eliminating the common-mode term (this increases the dynamic range and mitigates residual intensity noise, also called RIN), the balanced detection doubles the signal as well. It should be remarked that the balanced detector is a significant element of this design, as will be shown below. The use of an optical circulator in the path preceding the first 50/50 beam splitter enables the balanced detection for this interferometer.

An important feature of the embodiment shown in FIG. 1B is that the UD and DU paths are matched at all optical frequencies, regardless of the dispersion and properties of the optical paths. This is because the interferometer used for encoding is the same as the interferometer used for decoding. Therefore, OPD between the UD and DU paths is independent of frequency and therefore photons at every wavelength from source S will interfere simultaneously. Additionally, if the angle-modulation is independent of wavelength, the interference at D1 and D2 will also be identical and the amplitude modulation will coherently combine across wavelengths, enabling the use of light with large spectral width. This is an important advantage of this embodiment.

3.3 Signal Modulation and Demodulation

There are a number of different approaches for modulating (transmission) and demodulating (reception) signals. Both embodiments in FIGS. 1A and B transmit information $\phi_T(t)$ using the angle modulators. The function of the receiver, upon receiving the signal V(t) at the balanced detector is to recover the message. However, the received signal, depending on the modulation format and the location of the angle modulators, may not be directly related to $\phi_T(t)$. For example, for Embodiment A, the angle modulator AT2 results in a detection signal that is a phase difference whereas the modulator at AT1 results in a signal that is related to the phase. On the other hand, the detected signal in FIG. 1(b) is always a phase difference. Furthermore, in both embodiments, the detected signals is not the signal $\phi_T(t)$ itself, but rather the cos ( . . . ).

Therefore, we divide the demodulation problem into two large classes. The first is where the detected signal is the phase difference cos ($\Delta(t)$) where $\Delta(t)=\phi_T(t)-\phi_T(t-T_D)$, and the second where the detected signal is cos ($\phi_T(t)$). The former is relevant for Embodiment A where the AT2 is used (in the absence of AT1) and for FIG. 1B.

3.3.1 Demodulation of Differential Phase Signal

The demodulation of a differential phase signal is useful in many applications. For example, FM receivers are essentially differential phase receivers. An important feature in both Embodiment A and B is that they provide an all-optical method for FM demodulation (as shown below).

A principal issue is that the interferometer is essentially a "baseband" system in that difference signal $\Delta(t)$ appears as cos($\Delta(t)$) in the detected signal V(t). The problem with this is that cos(+$\Delta(t)$)=cos(-$\Delta(t)$) and therefore, for example, it is impossible to recover the sign of a function once it has passed through cos( . . . ). Therefore, it is essential to introduce an "intermediate frequency" or IF as is common in FM/PM receivers. This is in fact straightforward for white light concepts discussed here by introducing a receiver demodulation function $\phi_R(t)$ with a reference modulator. This modulation can be supplied by either the receiver (e.g. AR1 in FIG. 1A or A1 in FIG. 1B) or by the transmitter (e.g. AT2 in FIG. 1A or A2 in FIG. 1B). With this function, it will be shown that it is possible to obtain both the sin($\Delta(t)$) and cos($\Delta(t)$), thereby recovering the sign of the function and thus enabling an unambiguous recovery of the signal. Without this function $\phi_R(t)$, it would ordinarily be impossible to unambiguously recover the difference signal $\Delta(t)$ with only cos($\Delta(t)$).

Once the difference signal $\Delta(t)$ is obtained, there is still the problem of recovering $\phi_M(t)$ from $\Delta(t)$. For transmission of FM (frequency modulated) signals, this is not a problem because $$\Delta(t) = \phi_T(t) - \phi_T(t-T_D) \cong 2\pi T_D f_T(t) + \underbrace{\frac{1}{2}T_D^2 \frac{df_T}{dt}}_{\approx 0} + \ldots$$

Therefore, the recovered difference signal is simply the frequency modulated signal $f_T(t)$. It will be shown for $T_D f_T(t)$ small, this result implies that the interferometer demodulates an FM signal into base band all-optically without the need of RF demodulation. This result holds for both analog as well as digital signals, provided that frequency shifted keying (FSK) is used for the modulation format of digital signals.

For transmission of PM (phase modulated) signals, the recovery of $\phi_T(t)$ from $\Delta(t)$ can be done one of several ways. An inelegant approach is to construct a equalizing filter in the frequency domain and recover $\phi_T(t)$ by suitable tapped delay and summation circuits. A more elegant approach is suggested in the next section.

The bandwidth normalized by $T_D$, $\xi=B_M T_D$ is an important driver to the choice of the demodulation function. We consider here two regimes, namely, $\xi<1$ and $\xi>1$.

3.3.1.1 Narrowband Analog Signal $T_D<B_S^{-1}$

There are several specific techniques suitable for this regime, but perhaps the most straightforward and simple approach is for the receiver to frequency shift the return signal by a frequency $\phi_R(t)=\Omega_R t$ where $\Omega_R T_R=\pi/2$. This frequency can either be imparted additively by the transmitter through A2, or be supplied by the receiver at A1. An acousto-optic modulator for example could be used to impart a defined frequency shift. The choice of this frequency forces the interferometer to operate at the "sine" quadrature, which is to say:

$$V(t) = D_1(t) - D_2(t) = \frac{P_T}{2}\cos(\Omega_R t - \Omega_R(t-T_D) + \phi_T(t) - \phi_T(t-T_D))$$
$$= \frac{P_T}{2}\cos(\pi/2 + \phi_T(t) - \phi_T(t-T_D))$$
$$= \frac{P_T}{2}\sin(\phi_T(t) - \phi_T(t-T_D))$$
$$= \frac{P_T}{2}\sin(\Delta(t))$$

This result is significant. Although the sin( . . . ) function, like the cos( . . . ), cannot by itself recover the phase unambiguously, it has a very important property that for small arguments, it is linear and preserves the sign of $\Delta(t)$.

Therefore, for small $\Delta(t)$, the recovery of $\Delta(t)$ from $V(t)$ is particularly simple. The detected signal $V(t)$ can be expanded by Taylor series $$V(t) \cong \frac{P_T}{2}\left[\underbrace{\Delta(t)}_{\propto \xi} - \frac{1}{6}\underbrace{\Delta^3(t)}_{\propto \xi^3} + \ldots\right]$$

Figure 3:
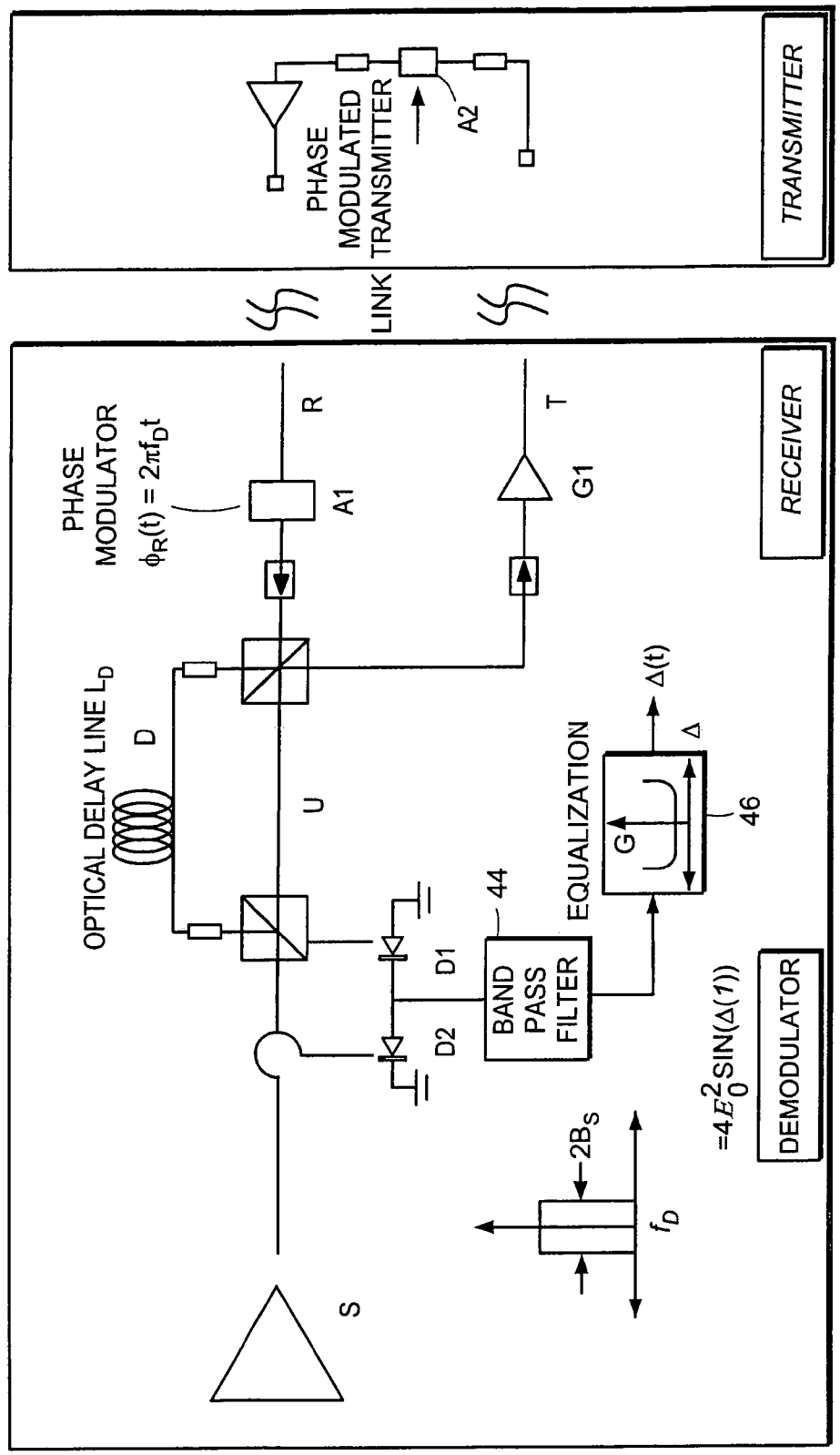
FIG. 3 is a detailed illustration of the communication system as in FIG. 2B which includes a frequency shifter in the return path and an equalizer in the demodulator.

For small $\Delta(t)$, the higher order terms can be ignored and only the lowest term in the expansion appears. In this limit, $V(t)$ is linear in $\Delta(t)$ and no equalization is required for signal extraction. For larger excursion, there are well established methods for equalization, and $\Delta(t)$ can be recovered to arbitrarily high precision. A block diagram is shown in FIG. 3 for the self-referential system. The demodulator includes a bandpass filter 44 and equalizer 46. The application to the non-self-referential system in FIG. 1A is identical.

Although the above technique is simple and straightforward to implement, there are two principal issues that have to be addressed. These are: (1) frequency shifters are much harder to build than phase modulators, especially at high frequencies, and (2) the value of $\Delta(t)$ is only determinable if $0<\Delta(t)<$.

Another solution for extracting narrowband signals is to have $\phi_R(t)$ $\beta \cos(\Omega_R t)$ where $\Omega_R T_R = n\pi$ $n=0,1,2,\ldots$ $|J_1(2\beta)|=|J_2(2\beta)|$ or $|J_0(2\beta)|=|J_1(2\beta)|$ This modulation is provided at the receiver by a phase modulator. Using these parameters the resulting signal $V(t)$ becomes $$V(t) = \frac{P_T}{2}\left[\cos\left(2\beta\sin\frac{\Omega_R T_R}{2}\sin(\Omega_R t)\right)\right]$$

$$\cos(\Delta(t)) - \frac{P_T}{2}\left[\sin\left(2\beta\sin\frac{\Omega_R T_R}{2}\sin(\Omega_R t)\right)\right]\sin(\Delta(t))$$

$$= \frac{P_T}{2}[J_0(2\beta) + 2J_2(2\beta)\cos(2\Omega_R t) + \ldots]$$

$$\cos(\Delta(t)) + \frac{P_T}{2}[2J_1(2\beta)\cos(6\Omega_R t) + \ldots]\sin(\Delta(t))$$

Figure 4:
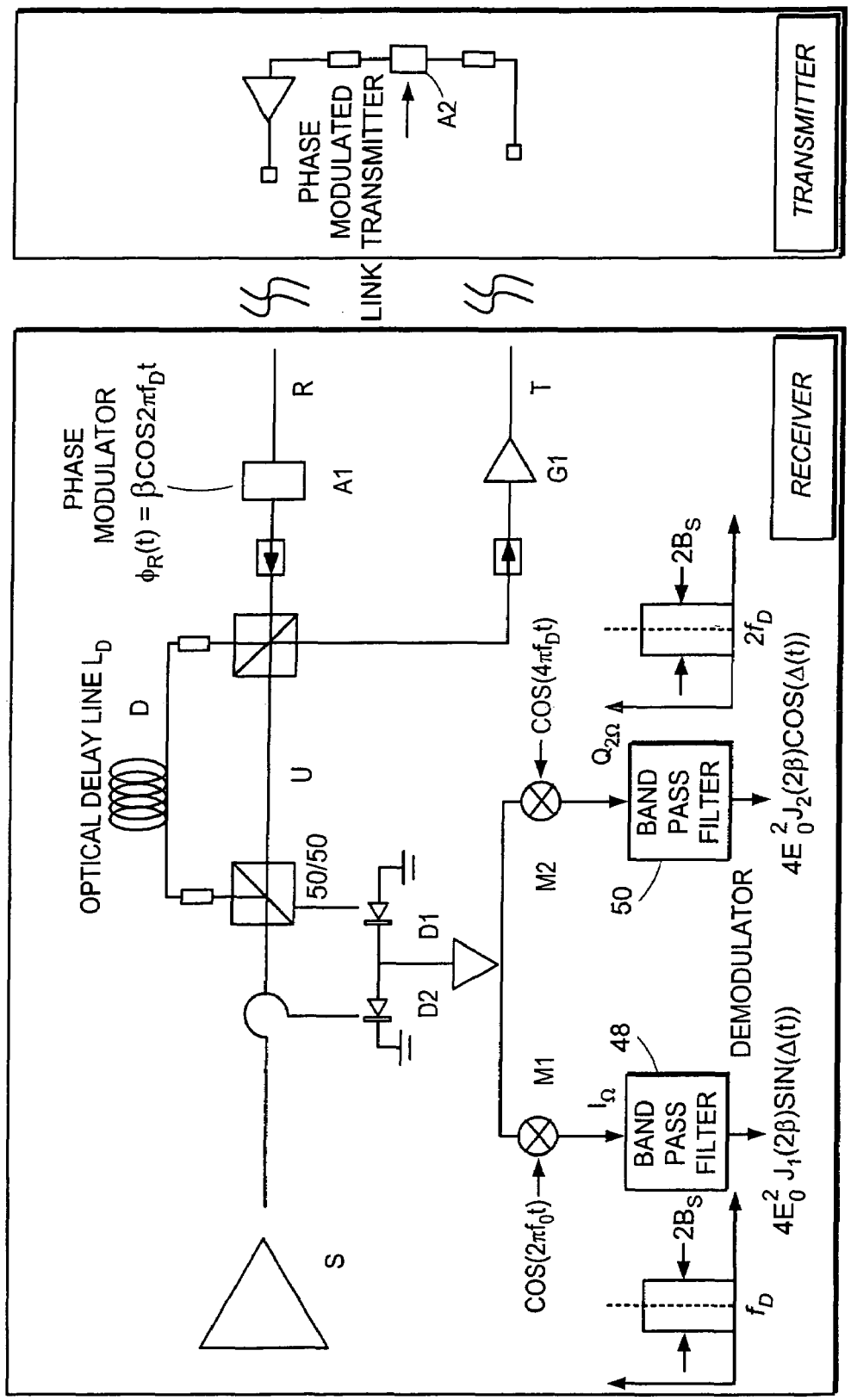
FIG. 4 is another embodiment of a system as in FIG. 2B using multi-tone demodulation.

Here, $J_n(x)$ is the Bessel function of even order. From $V(t)$, one recovers $\cos(\Delta(t))$ by either using the base-band signal or down-mixing $V(t)$ at $2\Omega_R$. The quadrature signal $\sin(\Delta(t))$ is likewise recovered by down mixing $V(t)$ and $\Omega_R$. The additive modulation $\phi_R(t)=\beta \cos(\Omega_R t)$ causes $\sin(\Delta(t))$ (in-phase) and $\cos(\Delta(t))$ (quadrature) be replicated and separated in the frequency domain provided $f_D > B_s$. The in-phase spectrum is replicated at every odd harmonic of the fundamental $f_D$, and the quadrature signal, at every even harmonic, with each occupying a bandwidth $B_s$. As shown in FIG. 4, these quadrature phase signals are extracted by down mixing M1 and M2 at the desired harmonics and bandpass filtering 48 and 50 about the selected harmonics.

It should be noted that any of the harmonics are acceptable since the spectral content will be identical at each harmonic. However, the amplitude of the I and Q signals depend on the modulation depth of $\phi_D(t)$. An illustration of the harmonic structure is shown in FIG. 5. In order to minimize distortion (for analog signals), it is preferable to balance the gain on I and Q and to minimize the power on harmonics outside the bandpass. Typically, this can be achieved by choosing the modulation depth such that amplitude of the even and odd harmonics are equal (e.g. $J_{2n}(2\beta)= J_{2m+1}(2\beta)$). It can be shown that the power in the unwanted sidelobes is minimized when the lowest order harmonics are chosen ($J_0(2\beta)=J_1(2\beta)$) (see FIG. 5).

Although the lowest harmonics are optimal (they minimize power in higher harmonics), for the purpose of illustration, the first and second order harmonics are shown in FIG. 4. Using this two-tone demodulation, the bandwidth of operation is doubled, and the need for a frequency shifter is eliminated.

Note that the demodulation requires only two mixers, one at $\Omega_R$ and the other at $2\Omega_R$. This is because, $\phi_R(t)$ is supplied by the receiver modulator A1 at the return port of the signal, and not by the transmitter modulator A2. By modulating at A1, $\Omega_R$ and $2\Omega_R$ supplying the I-Q demodulators can be phase-locked with respect to $\phi_R(t)$. This is difficult if $\phi_R(t)$ is at A2. By phase locking $\Omega_R$ and $2\Omega_R$, one does not require the quadrature signals at $\Omega_R$ and $20\Omega_R$, thereby eliminating the need for two additional mixers, and phase recovery circuits.

3.3.1.2 Wideband Analog Signal $T_D < B_S^{-1}$

In certain applications, the delay lines may introduce a delay that is much longer than the inverse bandwidth of the transmitted signal. For such wideband signals, the delay line introduces nulls in the spectrum at all harmonics about the fundamental frequency $nT_D^{-1}$ (for n=1, 2, ...). These nulls lead to unrecoverable signal loss.

In this section, we show a method that allows an unambiguous recovery of $\phi_T(t)$ when the delay lines are much longer than the inverse bandwidth of the input signal. In this method, the transmitter rather than transmitting the signal $\phi_T(t)$, transmits instead $$\phi_T(t) \to \beta\cos(\Omega_T t) + \phi_T(t)\cos\left(\Omega_T t + \frac{\pi}{4}\right)$$

$$\Omega_T T_D = \frac{\pi}{2}$$

$$J_0(2\sqrt{2}\,\beta) = 0$$

This yields the following signal for $V(t)$ $$V(t) = \cos\left(\beta\cos(\Omega_T t) + \phi_T(t)\cos\left(\Omega_T t + \frac{\pi}{4}\right) - \right.$$

$$\beta\cos(\Omega_T t - \Omega_T T_D) + \phi_T(t)\cos\left(\Omega_T t + \frac{\pi}{4} - \Omega_T T_D\right)\right)$$

$$= \cos\left(2\sqrt{2}\,\beta\cos\left(\Omega_T t + \frac{\pi}{4}\right) + \phi_T(t)\cos\left(\Omega_T t + \frac{\pi}{4}\right) - \right.$$

$$\phi_T(t - T_D)\sin\left(\Omega_T t + \frac{\pi}{4}\right)\right)$$

$$= \left\{[J_1(2\sqrt{2}\,\beta)] + [\text{Constant}][\phi_T(t)^2 + \phi_T(t-T_D)^2] + \ldots\right\} \times \phi_T(t)$$

where $J_1(x)$ is the Bessel function of order one.

As it can be seen, $V(t)$ is linear with $\phi_T(t)$ to lowest order as desired. All even-order harmonics are automatically suppressed by the requirement on $\beta$. The third order harmonic is reduced by the quantity $\phi_T(t)^2$. This quantity can be made arbitrary small by choosing small values of $\phi_T(t)$. For binary polar digital signals where $\phi_M(t)=\pm 1$, all $\phi_T(t)^2 = \phi_T(t-T_D)^2 = 1$ at all times. Therefore, $V(t)$ reduces to $V(t)=C\phi_T(t)$ and contains no unwanted delay signals. This result shows that by using a suitable modulation frequency, one can use delay lines with arbitrary lengths and still unambiguously recover a phase.

An important feature of this modulation scheme is that the receiver has to supply no local reference oscillator. The transmitter does all the work of providing the LO. This eliminates the need for locking circuitry (phase-locked loops) at the receiver, requiring only a single bandpass filter. This could be very useful in broadcast networks where the receiver has to be low cost and where demodulation electronics can be prohibitively expensive.

Another important feature of this scheme is that it allows the direct measure of $\phi_T(t)$ even when the received signal is in terms of $\Delta(t)$. This is an extremely useful property for embodiment in FIG. 1(b) since it allows both differential phase, as well as phase measurement.

3.3.2 Demodulation of Phase Signal

In Sec. 3.3.1, we showed that it is possible to obtain not just the phase difference, but also the phase itself for both Embodiments A and B. For Embodiment A, however, it is possible to directly obtain the modulated phase without going through the details described in 3.3.1.2 provided that the angle modulation is performed on the angle modulator AT1. Modulating AT1, the detected signal $V(t)=\cos(\phi_1(t))$. Therefore, the problem of recovering $\phi_1(t)$ is that much easier. Of course, as discussed in 3.3.1, the detected signal is a baseband signal where $+\phi_1(t)$ cannot be distinguished from $-\phi_1(t)$. However, this is not a problem and the results described in 3.3.1.1 can be readily used to obtain $\phi_1(t)$ unambiguously. Using either the AT2 angle modulator, or the modulator AR1 at the receiver, to supply an intermediate frequency, an unambiguous phase signal can be recovered.

The ability to measure the phase signal directly is not possible with current DPSK systems. Current coherent lightwave systems that measure phase require stable lasers with narrow linewidths.

4. Application of Technique to Communication Systems

Figure 6:
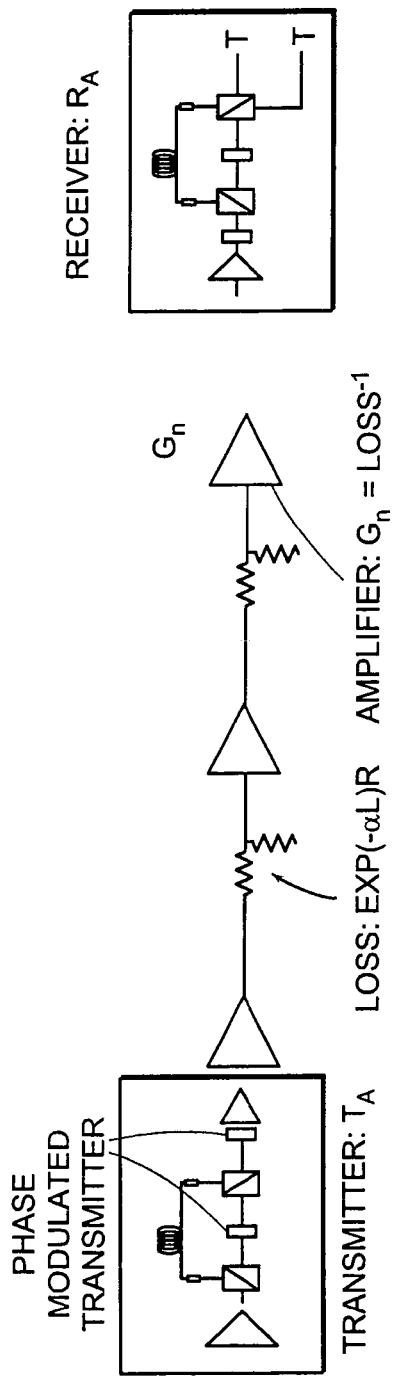
FIGS. 6 and 7 illustrate communications systems corresponding to FIGS. 2A and 2B, respectively, with amplifiers in the communication links.
Figure 7:
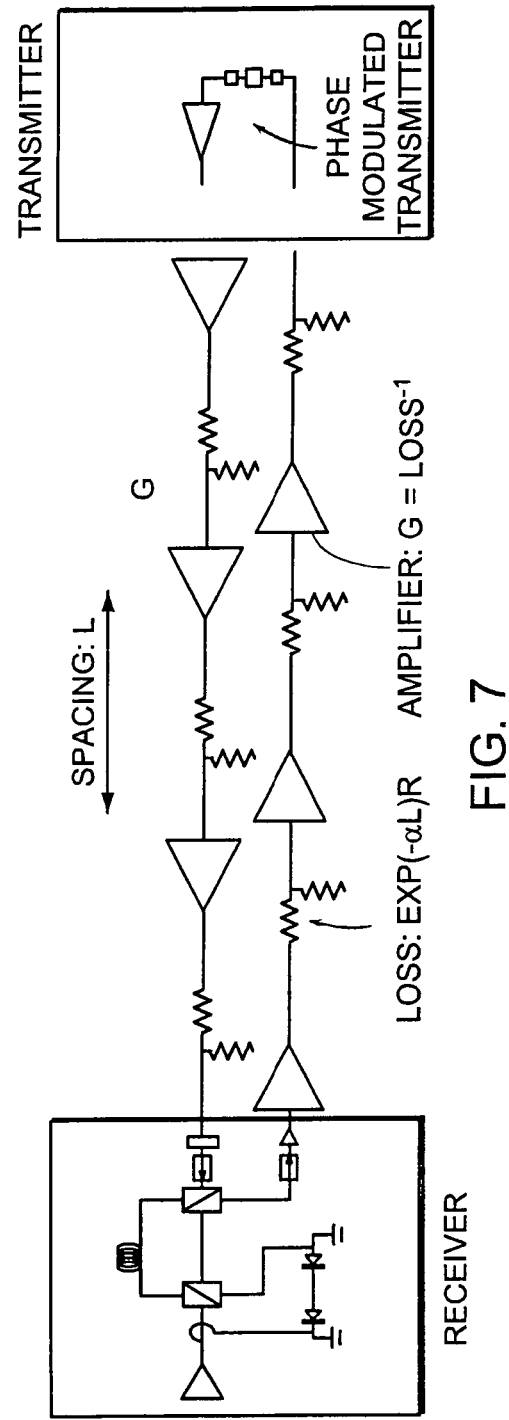

The envisioned link between the receiver and transmitter is shown in FIGS. 6 and 7 for Embodiments A and B. It is assumed to be lossy (e.g. fiber) with possibly a number of amplifiers G to boost the strength of the signal strength. These amplifiers compensate the loss accrued between successive gain stages. These lumped gain elements are typical in long-haul fiber optic networks. Note that there are no signal regeneration stages. This may be required in ultra-long haul links. The diagram above can be readily adapted to that scenario where the receiver-transmitter pair constitutes a single macro link between signal regeneration.

Perhaps the most important feature of the Embodiment B that requires comment is the coupled nature of the transmitter and receiver. It was noted in Sec. 1 that unlike conventional links the light path has to travel twice through the link in order to reach the detector. This has an immediate impact on the receiver SNR. To quantify this degradation, it is useful to consider the optical link budget.

The SNR at the receiver can be written as, $$SNR(\text{dB})=58+P_{in}(\text{dBm})-10\log_{10}(N)-\alpha L(\text{km})-NF\text{ (dB)}$$

where the input power $P_{in}$ is expressed in dB re 1 mW, N is the number of spans of length L, with a span loss of a (in dB/km). The 58 that appears in the expression is the reciprocal shot noise power in a 0.1 nm bandwidth along with few other numerical factors. The above expression is derived for a terrestrial fiber optic link with N amplifiers uniformly spaced between the transmitter and receiver, each with a noise figure (NF).

An interesting feature of the link analysis is that doubling the span (N→2N) only decreases the SNR by $10\log_{10}(2)=3$ dB. Therefore, the net SNR degradation by the double passing architecture for Embodiment B is only 3 dB. This 3 dB penalty does not appear for Embodiment A since it is a uni-directional.

To compensate for the lower SNR for Embodiment B, one must supply +3 dBm additional power at the source. In a normal link, non-linearities (especially self-phase and cross-phase modulation) in the fiber limit further increase in power. However, by using incoherent light, non-linear penalty can be significantly mitigated enabling much higher power operation.

Figure 8:
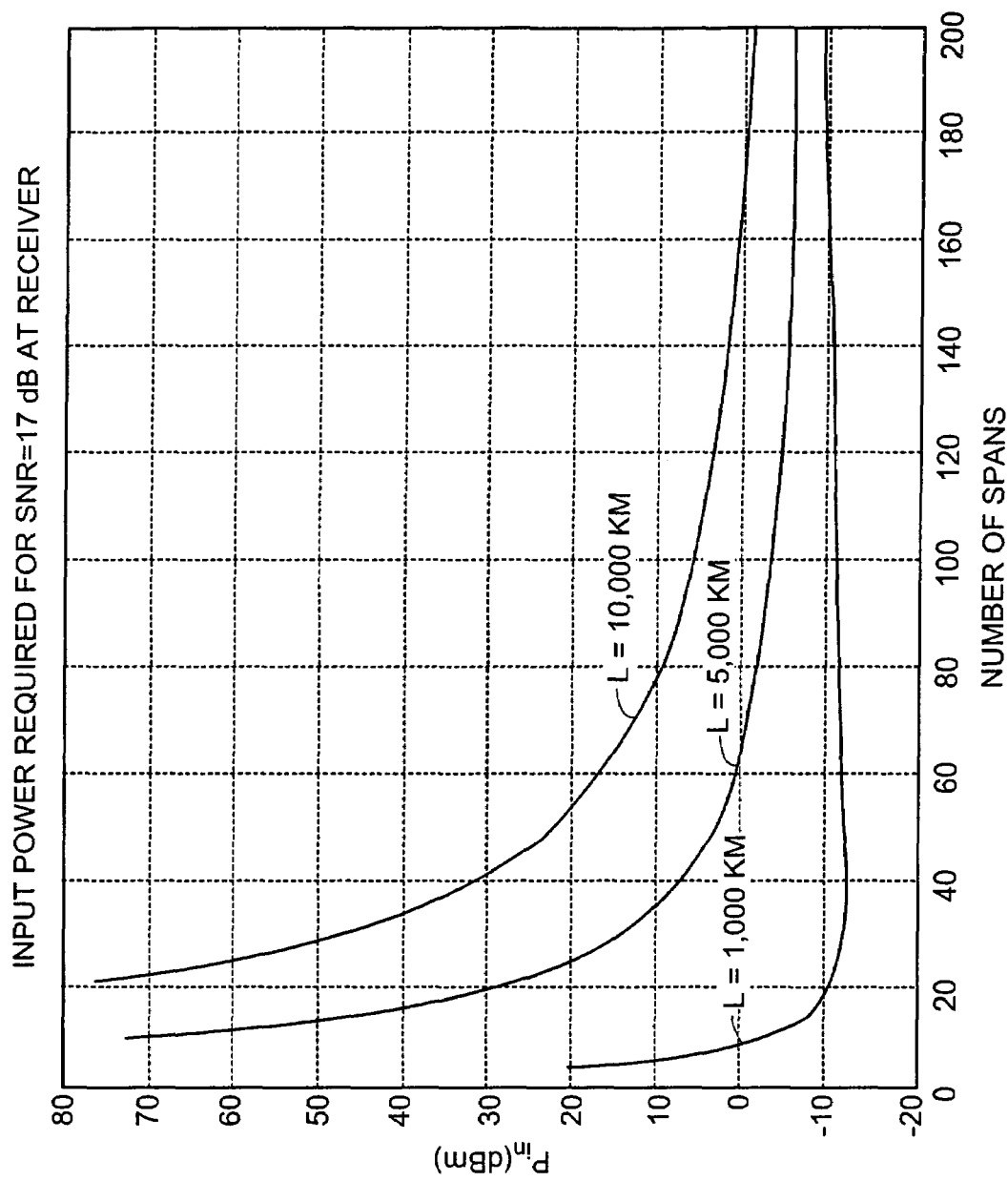
FIG. 8 indicates required input power for different total link lengths.

The impact of high power can be seen in FIG. 8 where the required input power for a given link length is plotted as a function of number of spans. For a typical 5,000 km long haul terrestrial optical link, an input power of 10 dBm (XPM threshold), roughly 35 spans are required. If on the other hand, if a technique could be devised to mitigate XPM and raise the threshold to 20 dBm, then only 25 spans are required. This is a significant reduction in the number of amplifiers required—which is an important cost driver in long haul terrestrial networks.

One of the important issues about increasing optical power is fiber non-linearity. Coherent light wave systems have markedly less sensitivity to non-linear processes such as XPM and SPM, because they are based on a constant amplitude carrier. However, there are always unavoidable sources of intensity noise or RIN that enter the link. These include: (1) amplitude noise in the transmitted light source, (2) multiple scattering (e.g. Rayleigh double back scattering and facet reflections) and (3) dispersion induced interference.

One important feature of the both the white-light based communication links described here is that they are not affected by multiple scattering and dispersion as in traditional coherent light wave systems. By using unpolarized incoherent light as the optical source, the white-light interferometric link incorporates both phase and polarization diversity in a simple direct way. Coherent interference only after the beam splitter that precedes the detectors D1 and D2 in both FIGS. 1A and 1B. There is no interference anywhere along the light paths U, D, T and R. Consequently, independent of dispersion and scattering, the light all along the path to the transmitter remains incoherent. Therefore, the only source of amplitude noise is RIN induced by signal beating with amplified spontaneous emission (ASE) from the amplifier chain. The XPM and SPM that arises from this noise can be readily estimated, and the overall SNR at the receiver can be estimated $$RIN = \frac{\sqrt{P_{ASE}P_{signal}}}{B_{signal}} \left[\frac{W}{Hz}\right]$$

$$\sigma_{SPM}^2 = \left(\frac{2\pi}{\lambda}L_{span}N_{span}\right)^2 \left(\frac{n_2}{A_{eff}}\right)^2 \frac{P_{ASE}P_{signal}}{B} \left[\frac{rad^2}{Hz}\right]$$

$$\sigma_{XPM}^2 = 2N_{channel}\sigma_{SPM}^2 \left[\frac{rad^2}{Hz}\right]$$

Here, $L_{span}$ is the span length between amplifiers, $N_{span}$ is the total number of spans in the link, $N_{channel}$ is the number of wavelength channels in a multi-channel/wavelength link.

4.1 Digital Transmission

Digital communication using the interferometer is an extremely interesting problem. Once again, there are two general strategies based on the approaches presented in the depending on whether the signal is a differential phase signal (Embodiment B and Embodiment A with AT2 modulation) or a phase signal (Embodiment A with AT1 modulation and Embodiment B using the techniques in 3.3.1.2). In either case, the techniques described in Sec. 3 can be readily adapted for digital transmission; however, there are a few subtle issues that require to be addressed.

4.1.1 Phase Shift Keying (PSK) and Quadrature Phase Shift Keying (QPSK)

This is probably the most straightforward system to analyze. Both Embodiments A and B can operate in this mode, but Embodiment B requires the use of the novel modulation scheme in 3.3.1.2 to suppress the differential signal that naturally arises in the method. Embodiment A on the other hand is much easier to implement since the underlying signal is non-differential.

Figure 9:
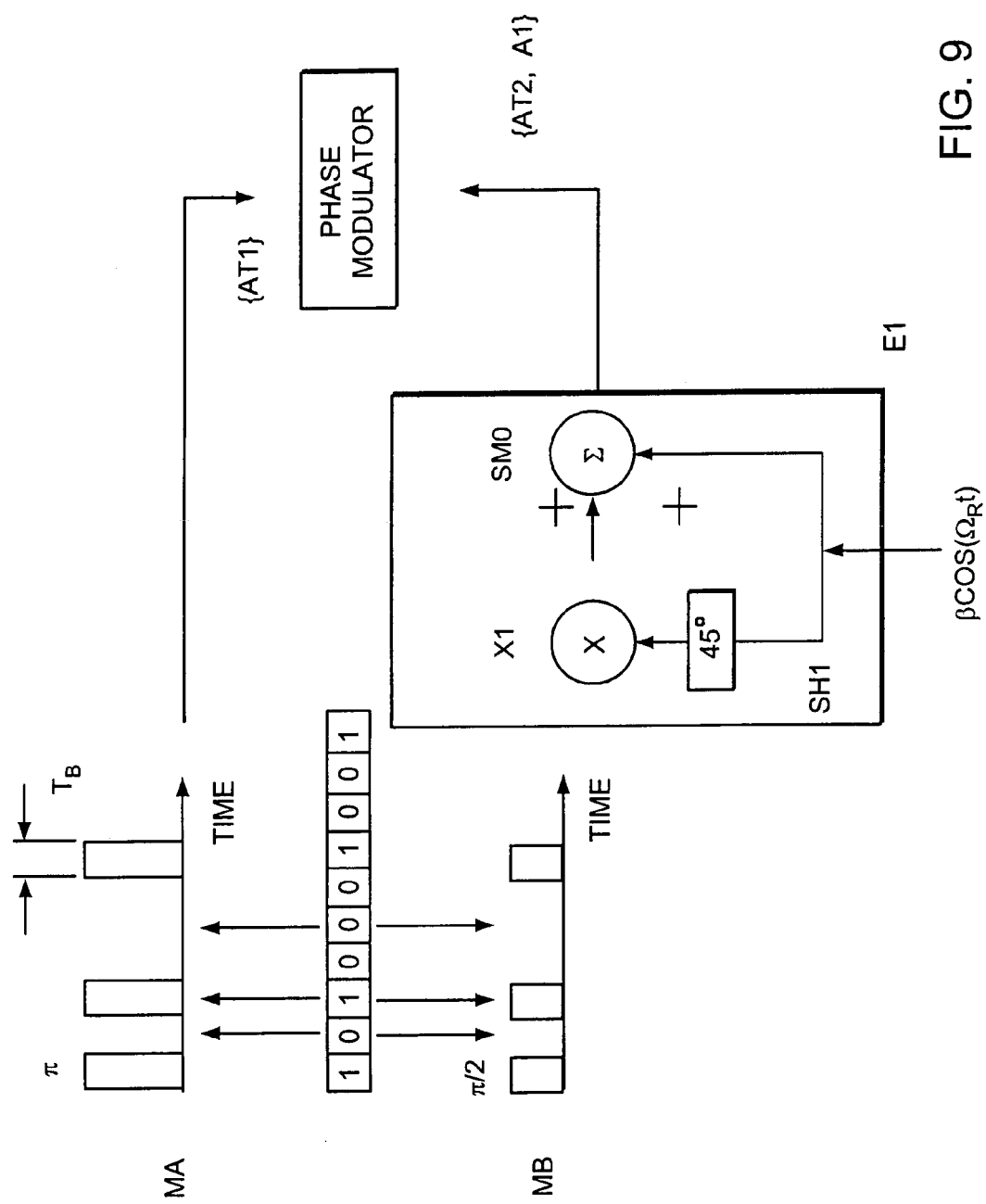
FIG. 9 illustrates a Binary Phase Shift Keying (BPSK) system.

In standard bi-polar return-to-zero (RZ) PSK (also called binary phase shift keying), the digital information is encoded with $\phi$ taking two values, with each corresponding to a binary state. FIG. 9 shows PSK as applied to Embodiments A and B, where the modulation is applied to angle modulators AT1 and AT2 for Embodiment A and at A1 for Embodiment B.

For Embodiment A where the modulation is applied to AT1, the received signal, as described in Sec. 3.3.1 is entirely at baseband (i.e. detector measures $\cos(\phi)$). Therefore, assigning $\phi=\{\pi,0\}$ leads to the detected signal taking two states, $\cos(\{\pi,0\})=\{-1,1\}$, which represents a bi-polar binary signal.

For modulation applied at AT2 in Embodiment A, or at A1 in Embodiment B, the technique described in 3.3.1.2 have to be used, and in this case the detector signal measured is $\cos(\phi)$. Therefore, in this case, one must assign $$\phi = \left\{-\frac{\pi}{2}, \frac{\pi}{2}\right\}$$

in order for the detected signal to map to two states, $\sin(\{-\pi/2,\pi/2\})=\{-1,1\}$, which again is the desired binary bi-polar signal.

Figure 10:
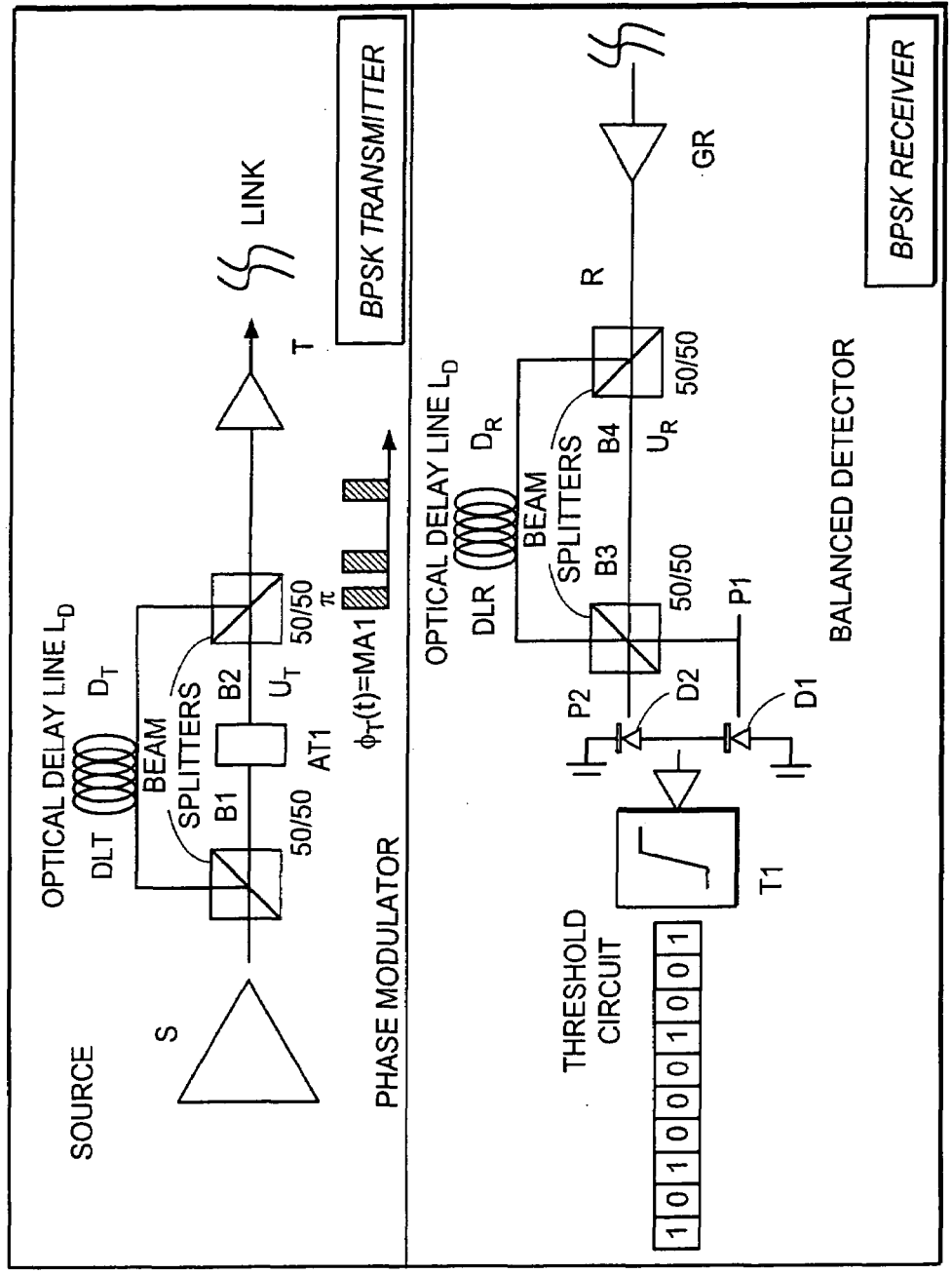
FIG. 10 illustrates a BPSK system.

In FIG. 9, MA and MB represent messages at the input to the phase modulators at AT1 and {AT2, A1} in Embodiments A and B. For Embodiment A, the modulation is particularly simple, where $\phi=\{\pi,0\}$ is applied directly to AT1. Provided that the length of the delay line $L_D$ at the transmitter and receiver are the same (to within the source coherence length), the modulation and demodulation is independent of length. This is a very attractive feature of this design. A block diagram illustrating the implementation of BPSK with Embodiment A in this mode is shown in FIG. 10.

For Embodiment B, the modulation and demodulation is a bit more complicated. In this case, one must encode the modulation using the encoder E1 that multiplies (X1) the message by a pure sinusoid at frequency $\Omega_R$ and adds (SM0) to it a reference tone $\Omega_R$ that is quarter wave phase shifted by the phase shifter SH1. The frequency $\Omega_R$ is chosen as described in Sec. 3.3.1.2 with $\Omega_R=\pi/T_D/2$. This multiplication and addition is applied at RF frequency and applied to the phase modulator {AT2, A1}. The received signal is demodulated using the multi-tone demodulation described in 3.3.1.1.

Figure 11:
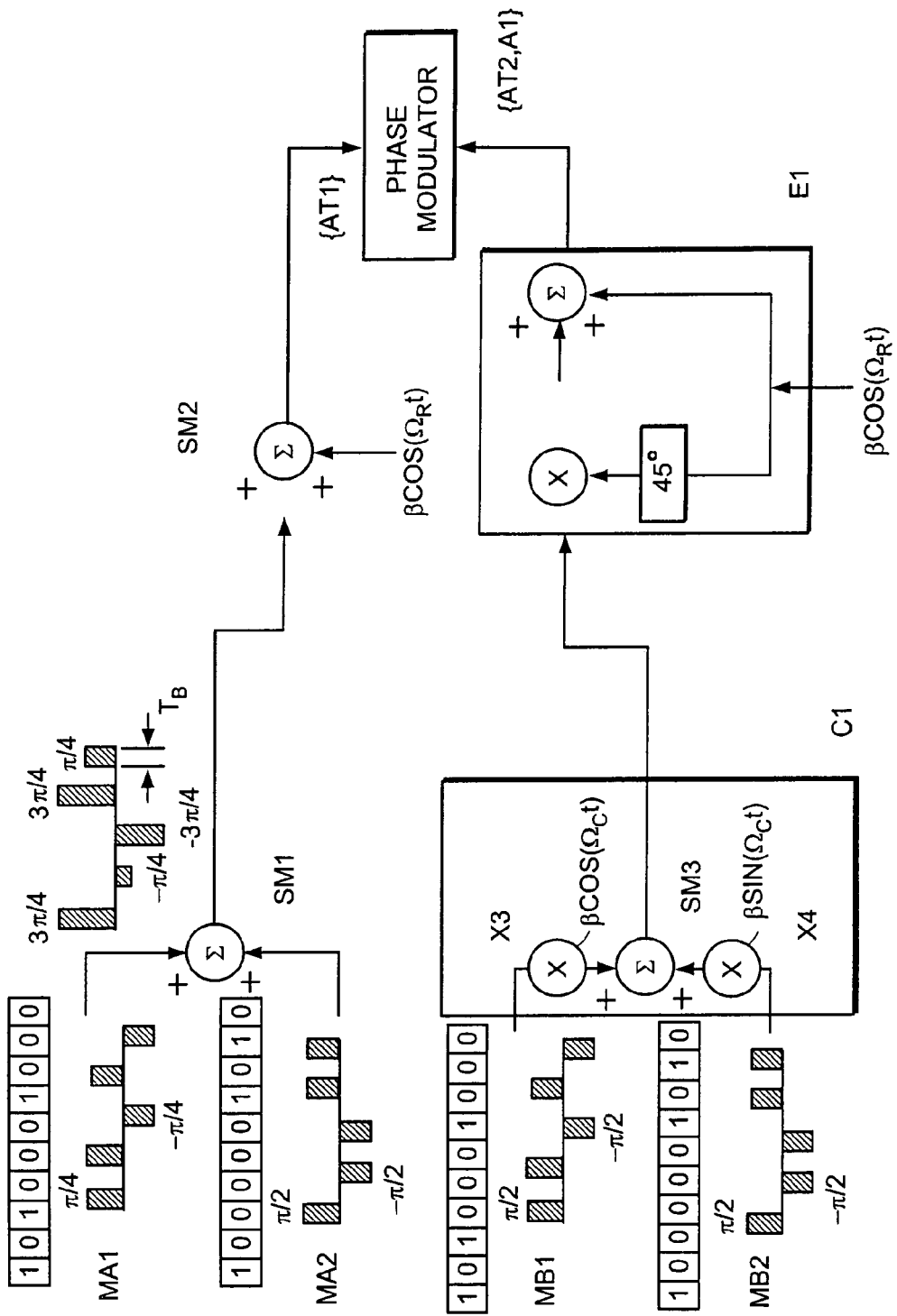
FIG. 11 illustrates a Quaternary/Quadrature Bi-Polar Phase Shift Keying (QPSK) system.

Another modulation scheme that is very attractive is quarternary (or quadrature) phase shift keying (QPSK). This is a well know format that doubles the channel capacity without increasing the needed bandwidth. This format is shown in FIG. 11. QPSK is essentially two PSK channels operating in parallel. It can also be viewed equivalently as a four-state (or termed "4-ary") phase modulation format. Two message streams MA1 and MA2 are combined into a single stream (electronically) and fed to the angle modulator at AT1 (Embodiment A), or message streams MB1 and MB2 are combined (electronically) and fed to an angle modulator at AT2/A1 (Embodiment B). The combined message is represented as one of four possible phases (shown are $$\phi = \left\{-\frac{3\pi}{4}, -\frac{\pi}{4}, \frac{\pi}{4}, \frac{3\pi}{4}\right\}.$$

Another equivalent picture is that two PSK channels are combined in "quadrature" where one channel is multiplied by $\sin(\Omega t)$ and the other by $\cos(\Omega t)$. Although both are equivalent, the first picture is better suited for Embodiment A where the modulation is applied at AT1, and the second is better suited for Embodiment B and for Embodiment A where the angle modulation is applied at AT2.

Demodulation of the signal proceeds using the multi-tone processing described in 3.3.1.1 for Embodiment A. To facilitate demodulation, a sinusoidal tone $\beta \cos(\Omega_R t)$ is added to the angle modulation at AT1. With the multi-tone processing, one obtains the demodulated signals $I=I_0 \sin(\phi(t))$, $Q=Q_0 \cos(\phi(t))$ where $I_0$ and $Q_0$ are amplitudes. The I and Q signals a bi-polar and are either positive or negative depending on the value of $\phi(t)$, and when passed to a binary thresholding circuit, take on the values $\{0,1\}$ (see Table I). Table I shows that from the sign of I and Q, it is possible to reconstruct MA1 and MA2 in a straightforward manner.

TABLE I

Data recovery from demodulated quadrature signals. (+/−) refers to sgn(I), sgn(Q). The notation ⊕ refers to "exclusive OR"/binary addition.

| MA1 | MA2 | φ | I | Q | I⊕Q = MA1 | I = MA2 |
|---|---|---|---|---|---|---|
| 0 | 0 | $-\frac{3\pi}{4}$ | (−) ⇒0 | (−) ⇒0 | 0 | 0 |
| 0 | 1 | $\frac{\pi}{4}$ | (+) ⇒1 | (+) ⇒1 | 0 | 1 |
| 1 | 0 | $-\frac{\pi}{4}$ | (−) ⇒0 | (+) ⇒1 | 1 | 0 |
| 1 | 1 | $\frac{3\pi}{4}$ | (+) ⇒1 | (−) ⇒0 | 1 | 1 |

Figure 12A:
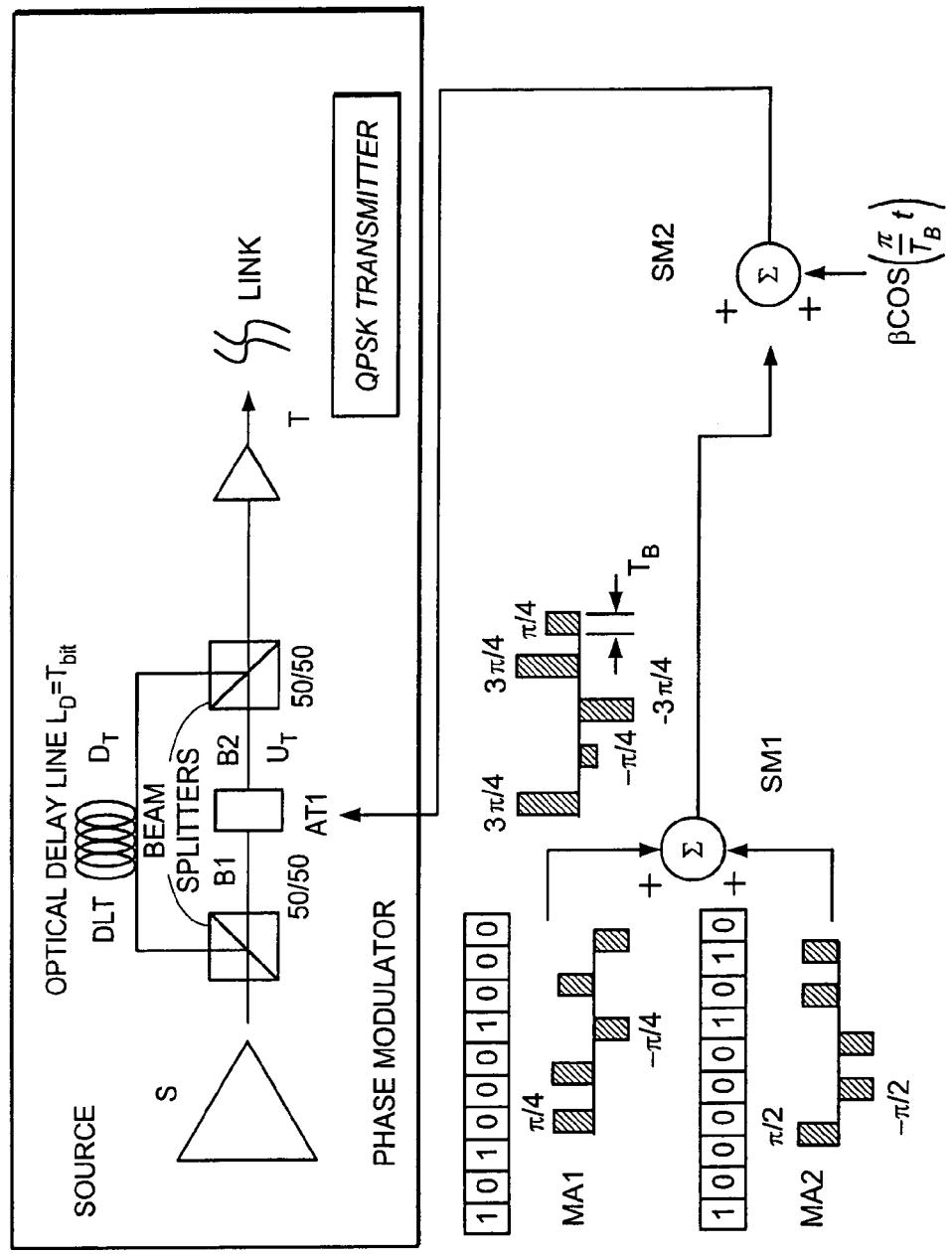
FIGS. 12A and 12B illustrate a QPSK transmitter and receiver, respectively.

Once again, provided that the length of the delay line $L_D$ at the transmitter and receiver are the same (to within the source coherence length), the modulation and demodulation is independent of length. This is a very attractive feature of this design. A block diagram illustrating the implementation of BPSK with Embodiment A in this mode is shown in FIGS. 12A and B.

The demodulation of the signal for Embodiment B, and for Embodiment A with AT2 modulation follows the approach outlined in 3.3.1.2. The recovery of the data from the demodulated signal $V_D(t)$ can be written $$V_D(t) = M_1(t)\cos(\Omega_C t) + M_2(t)\sin(\Omega_C t)$$

MB1 and MB2 can be recovered from $V_D(t)$ using well known methods. In fact, typical RF wireless systems that use QPSK employ quadrature mixing and summation as shown in FIG. 11 for Embodiment B.

Nevertheless, the implementation of QPSK is particularly elegant for Embodiment A for which AT1 is modulated because requires no multiplication. Although RF QPSK systems typically use quadrature mixers, RF links typically do not have the bandwidth of optical links. Optical links may require bandwidth in the excess of 10 GHz, and mixers that have wide bandwidth are not readily available at present. However, wide band power combiners (i.e summation circuits) are readily available and simple. Therefore, Embodiment A offers an important advantage in that it can be implemented readily with current technology.

4.1.2 Differential Phase Shift Keying (DPSK) and Differential Quadrature Phase Shift Keying (DQPSK)

It was seen in 4.1.1 that for Embodiment B and Embodiment A where AT2 was used, data recovery, though straightforward in concept, may prove difficult at high data rates due to unavailability of required electronics. The need for high bandwidth mixers arose from the requirements of the demodulation described in 3.3.1.2. However, it should be reminded that the demodulation scheme described in 3.3.1.2 is only required if the bandwidth of the signal is much larger than the $T_D^{-1}$. This situation arises only when the delay line is larger than the bit period $T_B$ (i.e. clock rate).

However, one can consider the system where the $T_D = T_B$. In this scenario, there is no need to demodulate the signal using 3.3.1.2. Instead, one can simply detect and threshold the signal as in Embodiment A where the AT1 modulator is modulated. The detected signal is still a differential phase signal in that $$V_D(t) = \phi(t) - \phi(t - T_B)$$

However, since the delay is exactly one bit period, one can recover $\phi(t)$ by assuming an initial reference bit. In fact, this is essentially the same as differential phase shift keying (DPSK), and is well known in traditional coherent lightwave systems. In traditional DPSK, the delay time $T_D = T_B$. However, there is one subtlety that needs to be noted. On one hand, the delay time has to be larger than the signal bandwidth ($T_D \leq B_S^{-1}$) (see 3.3.1.2). But on the other hand, in order for the undelayed and the twice-delayed paths through the interferometer to not interfere (see Sec. 3.1 and 3.2), one requires the spectral width of the source to be larger than the inverse delay time ($T_D \geq f_0^{-1}$). The first important question that arises is the compatibility of these mutually competing constraints.

A bandwidth efficient modulation scheme would have $B_S = \frac{1}{2}T_B$, but no practical data formats achieve this. In RF links, $B_S = 1/T_B$ (twice Nyquist) is more typical, and in optical links, it is impossible (at least, at present) to fabricate optical filters with a roll off sharp enough to support even twice the Nyquist rate. For example, current 10 Gbps fiber optic links typically require minimal channel spacing of 100 GHz, which is $20 \times f_{Nyquist}$.

However, for now, consider an optical source with a spectral width $f_0 = 1/T_B$ (which is perhaps attainable with some future filter), the cross-correlation between the delayed and undelayed paths of the interferometer (see Sec. 2.1) are $$\frac{\langle |E_s(t) E_s^*(t-\tau)|^2 \rangle}{\langle |E_s(t)|^2 \rangle^{1/2} \langle |E_s(t-\tau)|^2 \rangle^{1/2}} = \exp(-(\pi f_0 T_D)^2) = \exp(-\pi^2) = -42\text{dB}$$

Therefore, even under this extremely unrealistic source bandwidth, the cross talk between non-signal paths of the interferometer is acceptably small. With the more typical filters used current optical links, the isolation will be significantly better than −42 dB estimated above.

Figure 12B:
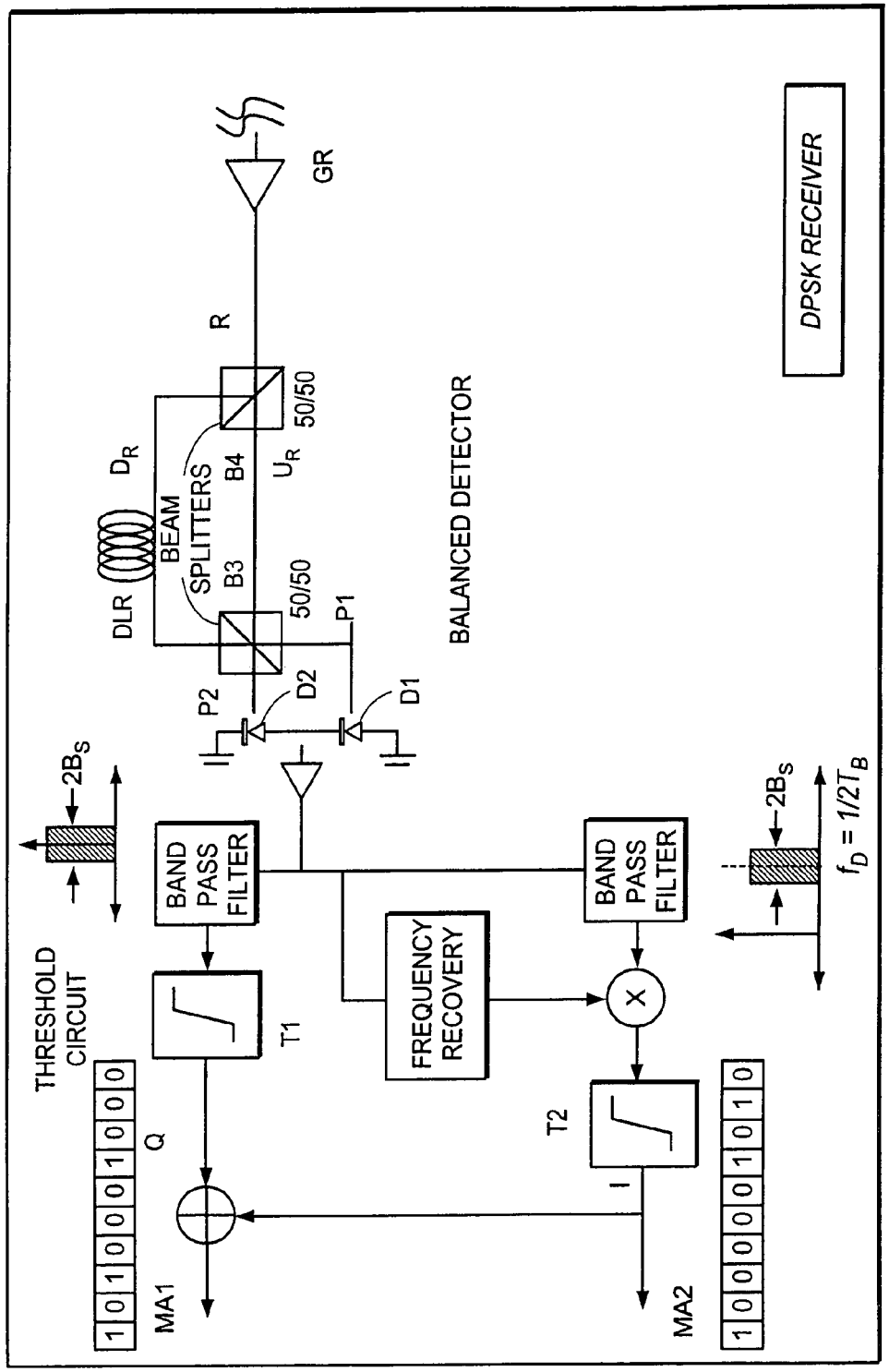
Figure 13:
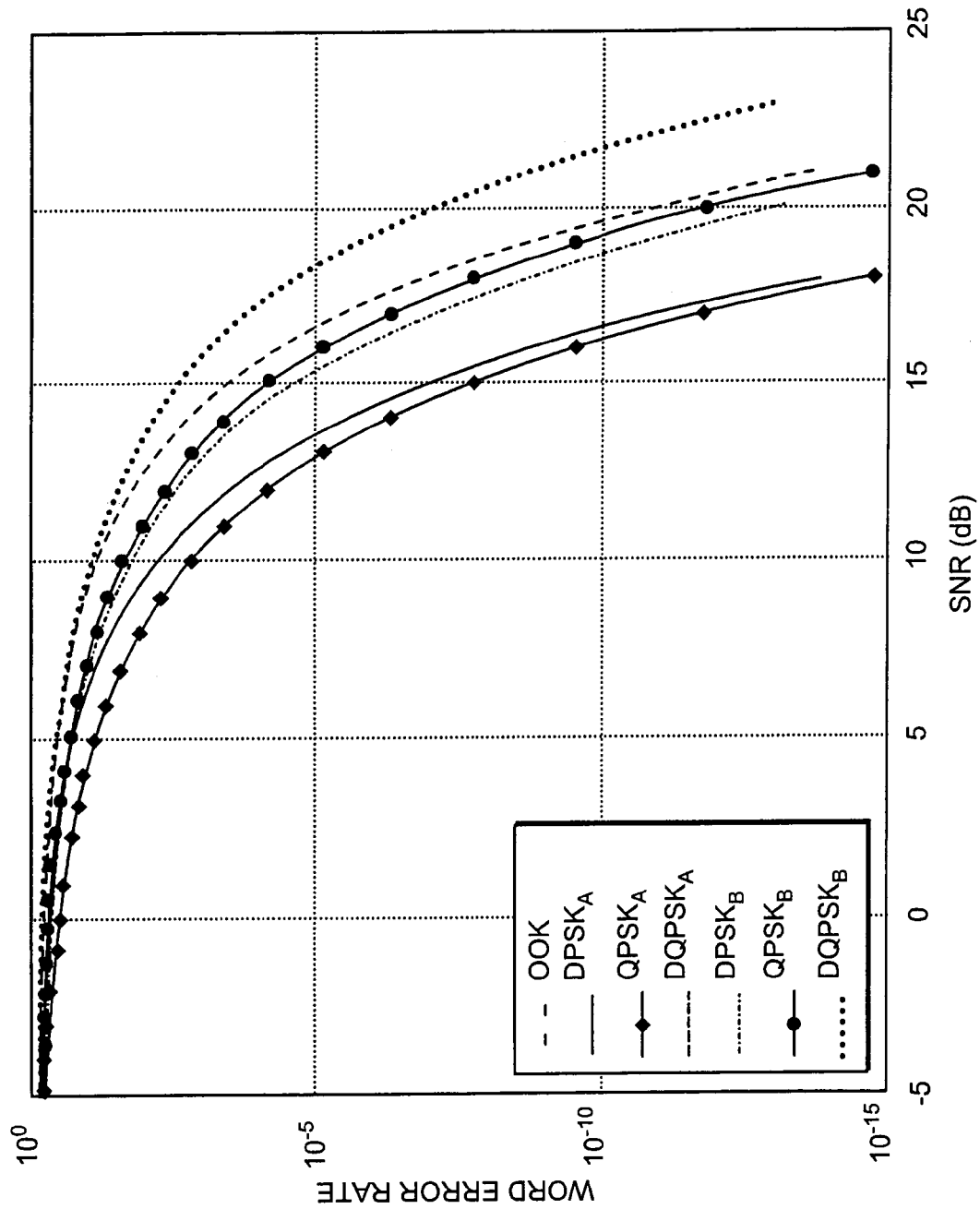
FIG. 13 illustrates a comparison of bit error rates for DPSK, QPSK, DQPSK and OOK systems.

Therefore, this analysis shows that white light interferometers with $T_D = T_B$ can be made without significantly affecting the assumptions that underlie the discussion in Sections 3.1 and 3.2. The implementation of a DPSK and DQPSK using Embodiment B is identical with that shown in FIGS. 9 and 11 respectively except: (1) the length of the delay line is $T_D = T_B$, and (2) the encoding E1 can be replaced by a summation (SM2) of a pure sinusoidal tone, $\beta \cos(\Omega_R t)$. The demodulation for DBPSK and DQPSK then proceeds as shown in FIG. 10 and FIG. 12(B) for BPSK and QPSK respectively for Embodiment A.

4.1.3 Performance Estimates

The noise properties of the PSK, QPSK, DPSK and DQPSK described in 4.1.1 and 4.1.2 are identical to conventional DPSK and DQPSK. The bit error rate (BER) as a function of input SNR is plotted FIG. 12. These are computed using results that are well known in the literature.

Also plotted for comparison is the BER for unipolar on-off keying (OOK) that is commonly used in intensity modulated links. Embodiment A using QPSK has identical performance as OOK, but with twice the bandwidth. Embodiment B with QPSK has a 3 dB poorer performance than OOK since it is a double pass system and for a fixed power, it has a lower receiver SNR.

The conclusion from this analysis is that despite the 3 dB loss in SNR due to double passing, the phase shift keying modulation format exactly compensates this loss. DQPSK, on the other hand, has a 3 dB penalty, however, this comes with a doubling in channel capacity. Thus, there is a tradeoff between power and channel capacity, which is not surprising.

4.2 Analog Communication

The embodiments discussed in 3.3 can all be readily applied to analog communications. The architecture for analog transmission and demodulation are identical with those shown in FIGS. 3, 4 and 6.

5. Other Implementations and Advanced Embodiments

Further improvements in channel capacity are possible through multiplexing additional channels at the transmitter. The general approach in multiplexing additional channels is to combine many interferometers in parallel through an optical multiplexer (MUX). The MUX can either combine several independent wavelengths in a lossless manner (using optical wavelength combiners or WDM), thereby preserving power, or combine several identical wavelengths in a lossy manner using multi-port optical couplers. This strategy is similar in spirit to wavelength division multiplexed (WDM) technology that is currently applied in IM-DD light wave networks.

Figure 14A:
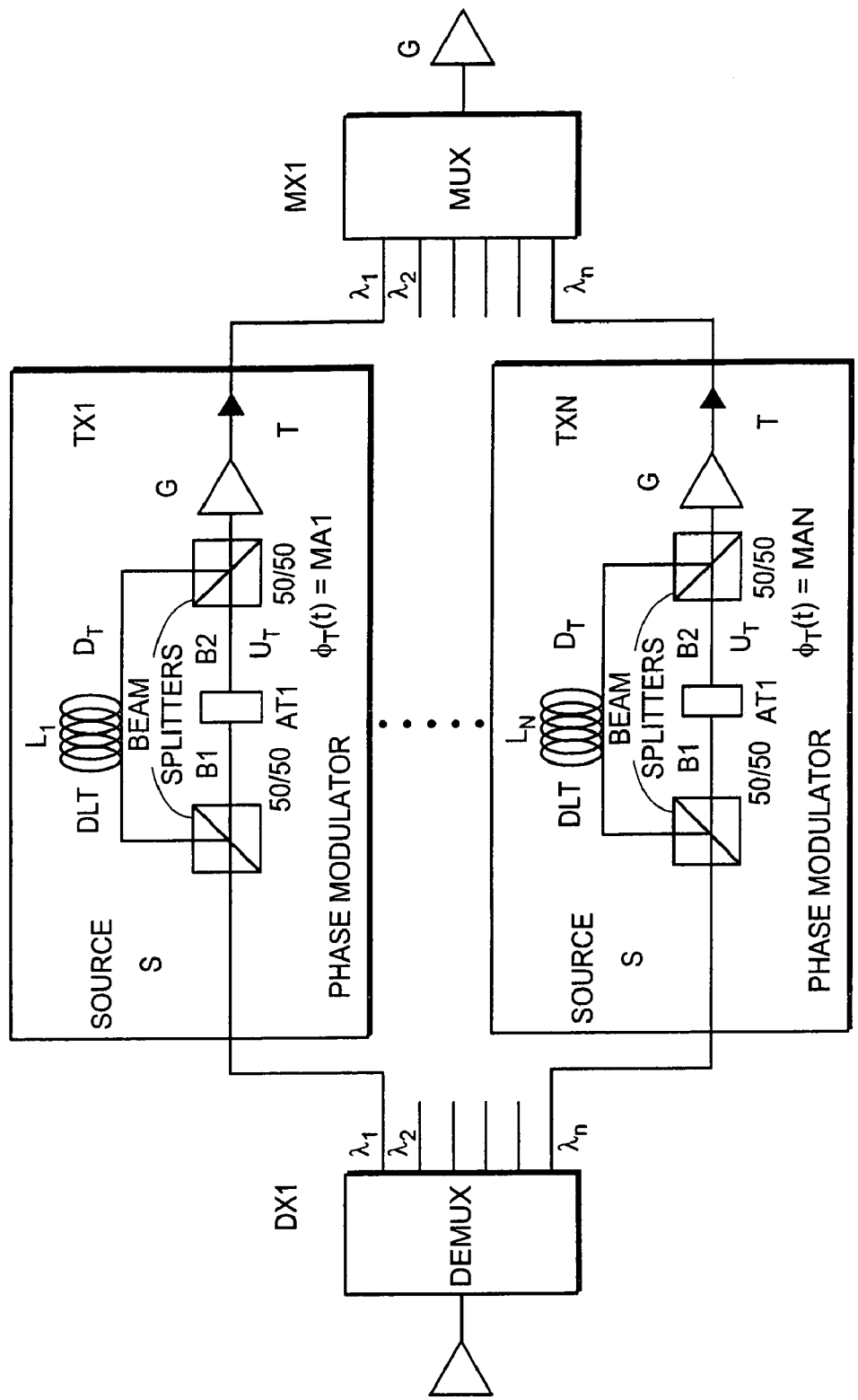
FIGS. 14A and 14B illustrate the transmitter and receiver, respectively, of a multi-channel communication system based on the approach of FIG. 2A.

Embodiment A enables a straightforward implementation of these two modalities as shown in FIG. 14(A) and (B). FIG. 14(A) shows a block diagram for a multichannel transmitter using Embodiment A for transmission and reception. An input incoherent broadband source is divided into N independent channels by a demultiplexer (DX1). The division can either be to separate wavelengths ($\lambda_1 \neq \lambda_2 \neq \ldots \lambda_N$), or to identical wavelengths ($\lambda_1 = \lambda_2 = \ldots \lambda_N$). The demultiplexed (DEMUX) source is then the source to each channel, which is itself an interferometer. Each channel consists of a separate transmit interferometer (TX1, TX2, ..., TXN) with a delay line, each with a delay line $T_k$ where each delay line differs from the other by at least a coherence time $T_{k \neq l} T_1$. Each interferometer is modulated according to the approach shown in FIGS. 10–12 and recombined by a multiplexer (MX1) and transmitted across the link on a single channel. Appropriate gain elements G are placed in the transmit and receive path to boost signal to compensate for any loss in the multiplexing/demultiplexing process.

Figure 14B:
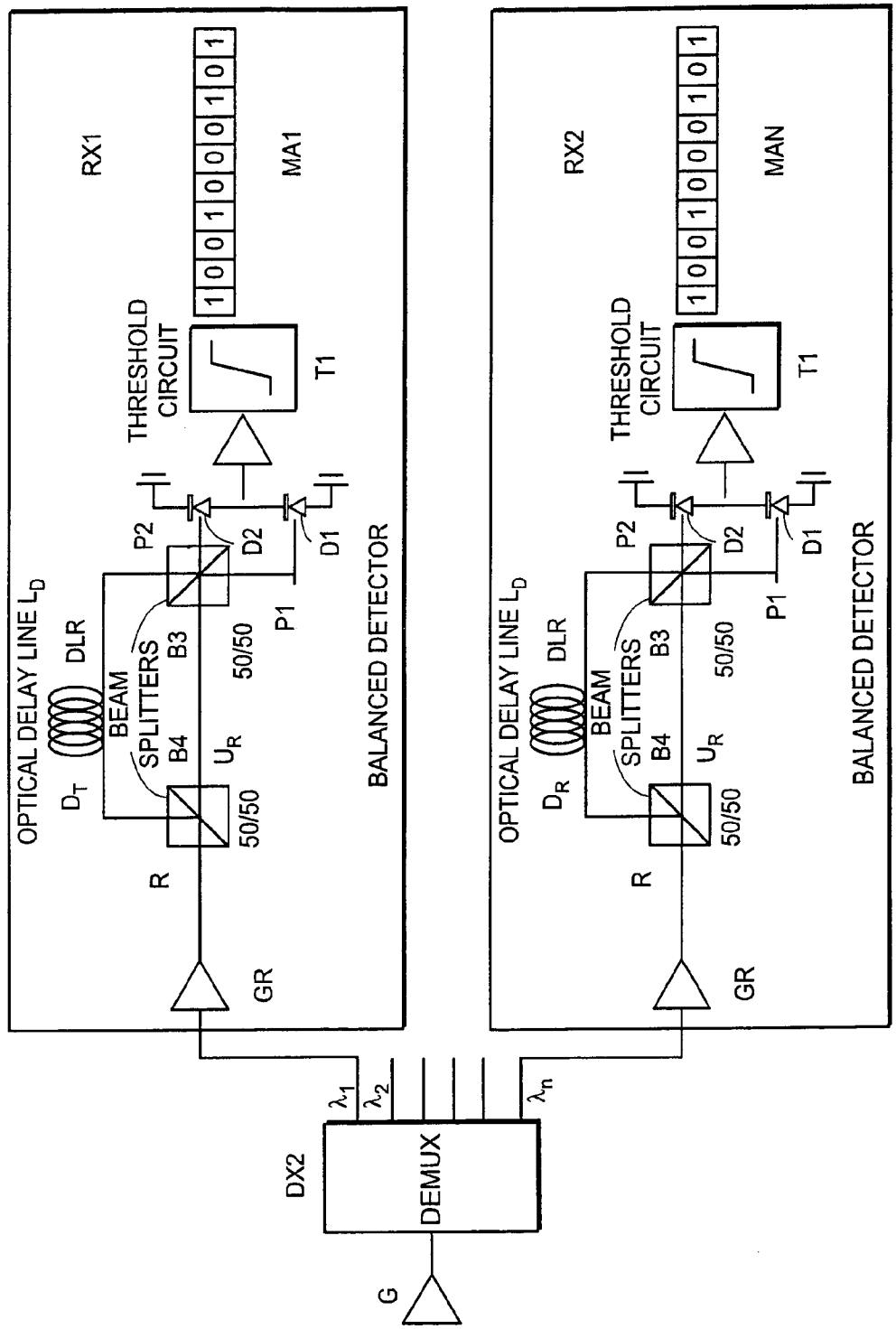

The multi-channel receiver shown in FIG. 14B separates the received signal into N channels through a DEMUX (DX2). The separation can either be lossy (if $\lambda_1 = \lambda_2 = \ldots \lambda_N$) or lossless (if $\lambda_1 \neq \lambda_2 \neq \ldots \lambda_N$). Appropriate gain elements G are placed in the receiver prior to multiplexing/demultiplexing in order to compensate for any loss in the signal division. Each channel is then demodulated into messages MA1, MA2, ... MAN by receivers RX1, RX2, ..., RXN using techniques shown in FIGS. 9–12 depending on the modulation format employed by the transmitter.

For lossy combining, the approach shown in FIG. 14 requires $N^2$ additional power (over a single channel) for an N-fold increase in channel capacity (where N is the number of channels). However, an important feature of this approach is that one does not need additional optical bandwidth in order to increase channel capacity. Therefore, the spectral efficiency (capacity per optical bandwidth) increases as N. For applications where increased optical bandwidth is difficult (or expensive), this feature may be very attractive.

For lossless combining, there is only N additional increase in power for an N-fold increase in channel capacity. This is power efficient, compared with lossy combining. However, there is a corresponding increase in optical bandwidth. When increase in optical bandwidth is not difficult (or costly), this approach is preferable.

Figure 15A:
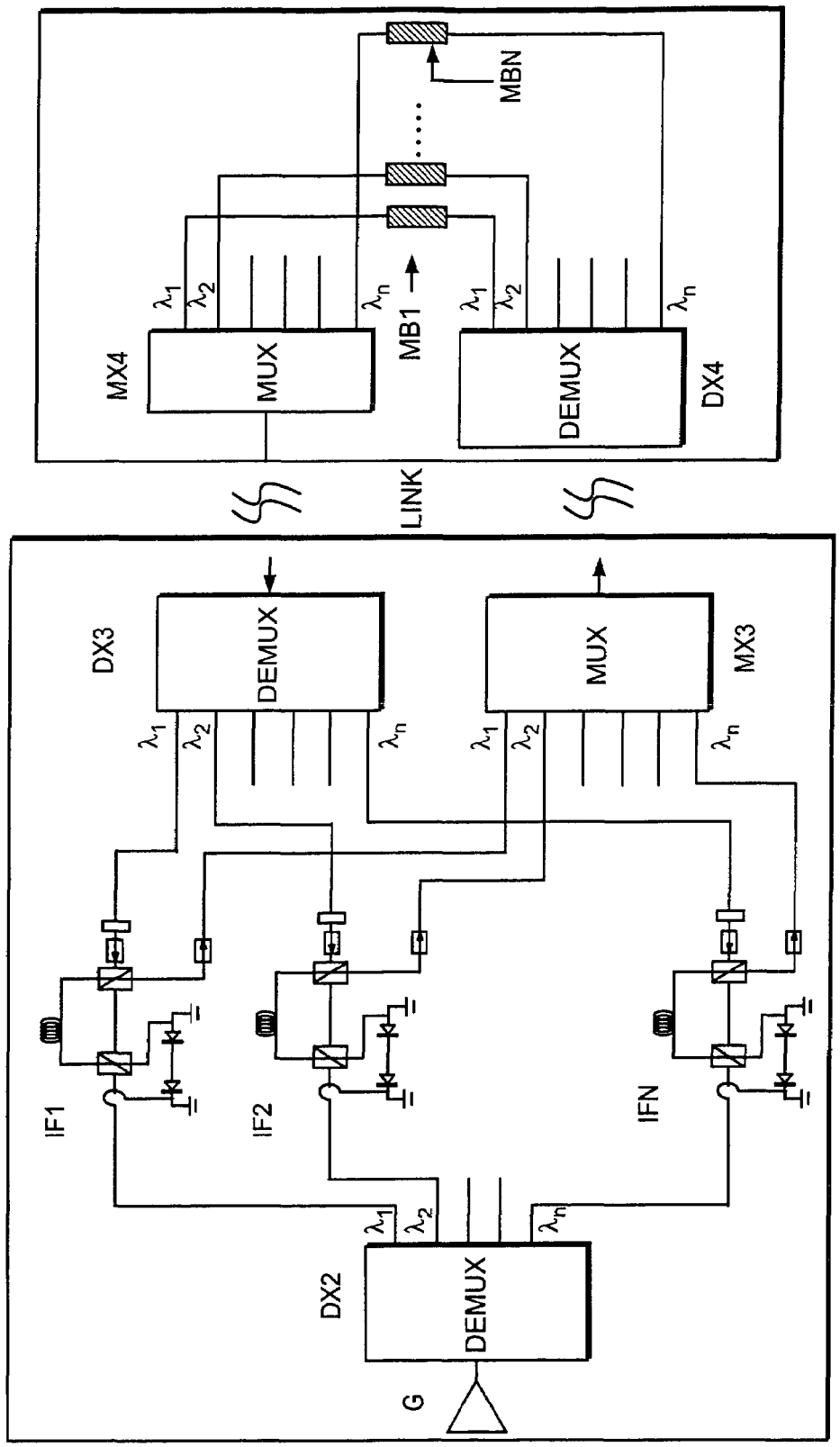
FIGS. 15A and 15B illustrate multi-channel systems based on FIG. 2B.

For Embodiment B, there are two general strategies shown in FIGS. 15(A) and (B). In the first approach, multiple interferometers IF1, IF2, ... IFN, each operating at a different wavelength, are multiplexed by the receiver and sent to the transmitter. The source can come from a single spectrally broad source that is divided into many wavelengths. The transmitter separates each of the wavelengths and separately phase modulates each wavelength, and recombines the wavelengths into a single transmit beam which then is demodulated by the receiver. As mentioned above, non-linear interaction between adjacent wavelength through XPM is expected to be small, but the cross talk can be further reduced by adding a dispersive element in the interferometer paths such that $$n(\omega_k)D_k - n(\omega_k)U_k - L_{bit} = cT_{bit}$$

$$n(\omega_k)D_k - n(\omega_l)D_l \gg L_{coh}, \; n(\omega_k)U_k - n(\omega_l)U_l \gg L_{coh} \text{ for } k \neq l$$

Thus, no two interferometers are identical, even though each interferometer is constructed such that the path difference between its delayed and undelayed arms are exactly one bit time in length.

Figure 15B:
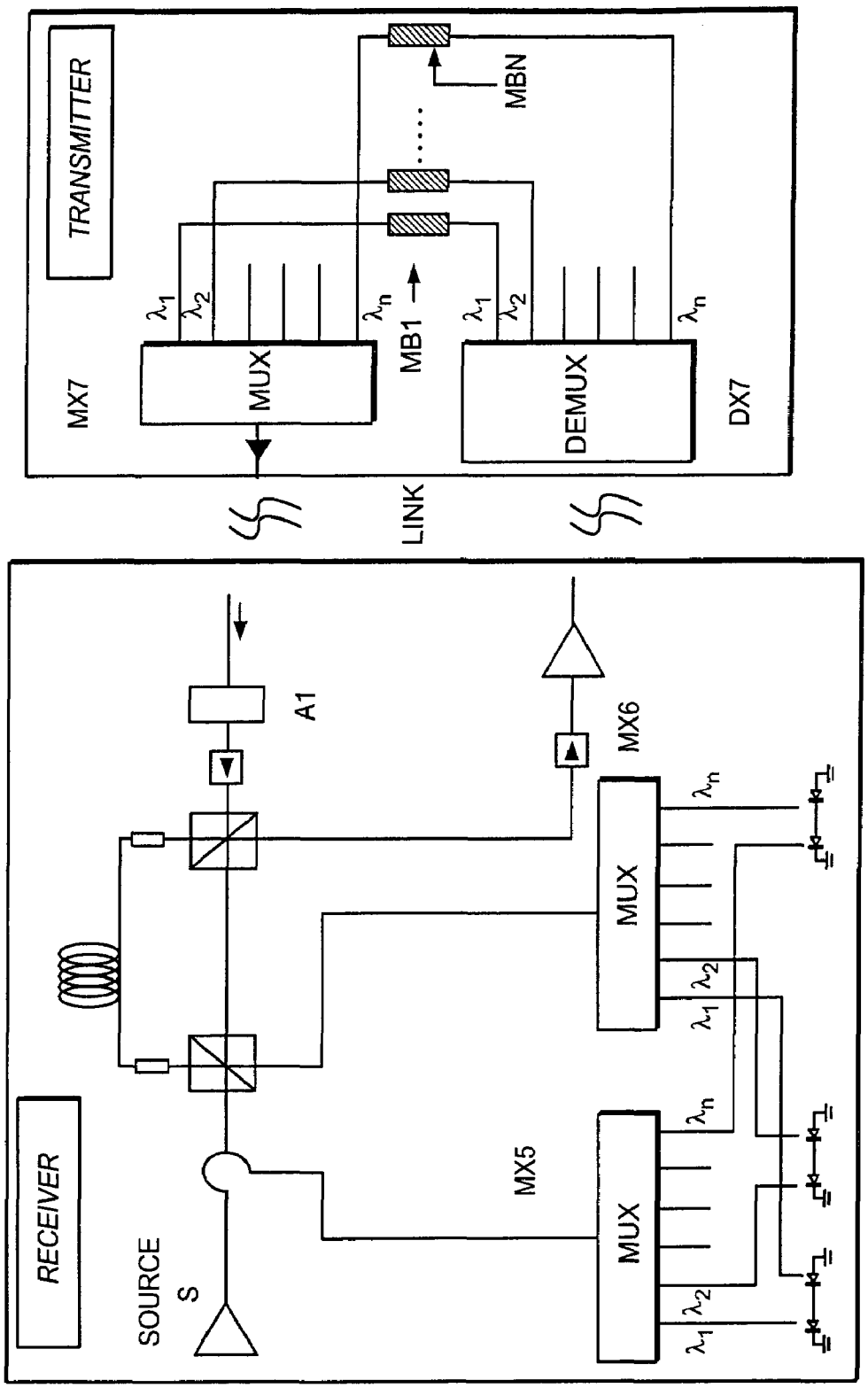

The second embodiment in FIG. 15B is similar in spirit to FIG. 15A, but uses only a single interferometer. In this embodiment, a single delay line is used to form the interferometer. The transmitter is similar in design as in FIG. 15A. The received signal being multiplexed to plural detectors.

While this invention has been particularly shown and described with references to preferred embodiments thereof, it will be understood by those skilled in the art that various changes in form and details may be made therein without departing from the scope of the invention encompassed by the appended claims.

What is claimed is:

1. A communication system comprising:
   a light source;
   first and second light paths which receive light from the light source and which combine in a combined light path, the first and second light paths having an optical path length difference;
   third and fourth light paths which receive light from the combined light path, the third and fourth light paths having substantially the same optical path length difference as the first and second light paths;
   a signal optical angle modulator in one of the light paths;
   a reference optical angle modulator in one of the light paths;
   a detector which receives light from the third and fourth light paths and detects a signal from the signal optical angle modulator.

2. A communication system as claimed in claim 1 wherein the detector comprises a demodulator which recovers the signal using at least one frequency imposed by the reference optical angle modulator.

3. A communication system as claimed in claim 2 wherein the detector is a balanced detector which subtracts non-interfering components of the detected light.

4. A communication system as claimed in claim 3 wherein light through one of the third and fourth light paths is directed to an element of the balanced detector by a circulator.

5. A communication system as claimed in claim 3 wherein the light source includes a range of wavelengths.

6. A communication system as claimed in claim 3 wherein the coherence length of the light source is less than said optical path length difference.

7. A communication system as claimed in claim 1 wherein the detector is a balanced detector which subtracts non-interfering components of the detected light.

8. A communication system as claimed in claim 7 wherein light returned through one of the third and fourth light paths is directed to an element of the balanced detector by a circulator.

9. A communication system as claimed in claim 1 wherein the light source includes a range of wavelengths.

10. A communication system as claimed in claim 1 wherein the first and second light paths and the third and fourth light paths are formed by a single interferometer.

11. A communication system as claimed in claim 10 wherein the light source, interferometer and detector are in a receiver and the signal optical modulator is in a transmitter separated from the receiver by an optical link.

12. A communication system as claimed in claim 11 wherein the detector comprises a demodulator which recovers the signal using at least one frequency imposed by the reference optical angle modulator.

13. A communication system as claimed in claim 12 wherein the detector is a balanced detector which subtracts non-interfering components of the detected light.

14. A communication system as claimed in claim 13 wherein light through one of the third and fourth light paths is directed to an element of the balanced detector by a circulator.

15. A communication system as claimed in claim 13 wherein the coherence length of the light source is less than said optical path length difference.

16. A communication system as claimed in claim 11 wherein the detector is a balanced detector which subtracts non-interfering components of the detected light.

17. A communication system as claimed in claim 16 wherein light through one of the third and fourth light paths is directed to an element of the balanced detector by a circulator.

18. A communication system as claimed in claim 11 wherein the light source includes a range of wavelengths.

19. A communication system as claimed in claim 11 wherein the coherence length of the light source is less than said optical path length difference.

20. A communication system as claimed in claim 1 wherein the coherence length of the light source is less than said optical path length difference.

21. A communication system as claimed in claim 1 comprising plural sets of first, second, third and fourth light paths having independent signal modulators, plural modulated signals being combined on a common communication link.

22. A method of communication comprising:
    directing light from a light source through first and second light paths to a combined light path, the first and second light paths having an optical path length difference;
    directing light from the combined light path through third and fourth light paths having substantially the same optical path length difference as the first and second light paths;
    angle modulating light in one of the light paths with a signal;
    angle modulating light in one of the light paths with a reference; and
    detecting a signal from modulated light received through the third and fourth light paths.

23. A method as claimed in claim 22 wherein the signal is detected with a demodulator using at least one frequency imposed by the reference.

24. A method as claimed in claim 23 wherein the signal is detected in a balanced detector which subtracts non-interfering components of the detected light.

25. A method as claimed in claim 24 wherein light through one of the third and fourth light paths is directed to an element of the balanced detector by a circulator.

26. A method as claimed in claim 24 wherein the light source includes a range of wavelengths.

27. A method as claimed in claim 24 wherein the coherence length of the light source is less than said optical path length difference.

28. A method as claimed in claim 22 wherein the signal is detected in a balanced detector which subtracts non-interfering components of the detected light.

29. A method as claimed in claim 28 wherein light through one of the third and fourth light paths is directed to an element of the balanced detector by a circulator.

30. A method as claimed in claim 22 wherein the light source includes a range of wavelengths.

31. A method as claimed in claim 22 wherein the first and second light paths and the third and fourth light paths are formed by a single interferometer.

32. A method as claimed in claim 31 wherein the light source and interferometer are in a receiver with a detector, and a signal modulator is in a transmitter separated from the receiver by an optical link.

33. A method as claimed in claim 32 wherein the signal is detected with a demodulator using at least one frequency imposed by the reference.

34. A method as claimed in claim 33 wherein the detector is a balanced detector which subtracts non-interfering components of the detected light.

35. A method as claimed in claim 34 wherein light through one of the third and fourth light paths is directed to an element of the balanced detector by a circulator.

36. A method as claimed in claim 34 wherein the coherence length of the light source is less than said optical path length difference.

37. A method as claimed in claim 33 wherein the signal is detected in a balanced detector which subtracts non-interfering components of the detected light.

38. A method as claimed in claim 37 wherein light through one of the third and fourth light paths is directed to an element of the balanced detector by a circulator.

39. A method as claimed in claim 33 wherein the light source includes a range of wavelengths.

40. A method as claimed in claim 33 wherein the coherence length of the light source is less than said optical path length difference.

41. A method as claimed in claim 22 wherein the coherence length of the light source is less than said optical path length difference.

42. A method as claimed in claim 22 wherein light is directed on plural sets of first, second, third and fourth light paths having independent signal modulators, plural modulated signals being combined on a common communication link.

43. A communication system comprising:
    a receiver comprising:
        a light source;
        an interferometer which receives light from the light source, the interferometer having first and second light paths, light combined from the first and second light paths being directed to a transmitter; and
        a detector which receives light returned from the transmitter through the first and second light paths of the interferometer and detects a signal from the transmitter; and
    a transmitter comprising a signal optical angle modulator;
    the system further comprising a reference optical angle modulator.

44. A system that is claimed in claim 43, wherein the coherence length of the light source is less than an optical path length difference of the interferometer.

45. A system as claimed in claim 43, wherein the detector is a balanced detector which substracts non-interfering components of the detected light.

46. A system as claimed in claim 45, wherein the coherence length of the light source is less than an optical path length difference of the interferometer.

47. A method of communication comprising:
    directing light from a light source through first and second light paths of an interferometer;
    directing light combined from the light paths of the interferometer to a transmitter;
    at the transmitter, angle modulating the combined light with a signal;
    returning the angle modulated light to the interferometer;

angle modulating light in one of the light paths with a reference; and detecting a signal from angle modulated light received from the transmitter through the first and second light paths of the interferometer.

48. A method as claimed in claim 47 wherein the coherence length of the light source is less than an optical path length difference of the interferometer.

49. A method as claimed in claim 47 wherein the signal is detected in a balanced detector which substracts non-interfering components of the detected light.

50. A method as claimed in claim 49 wherein the coherence length of the light source is less than an optical path length difference of the interferometer.

* * * * *